United States Patent
Matsumoto et al.

(10) Patent No.: US 6,246,491 B1
(45) Date of Patent: *Jun. 12, 2001

(54) IMAGE COMMUNICATION APPARATUS HAVING MULTIPLE STORAGE UNITS AND CONTROL BASED ON DETECTED PAGE NUMBER

(75) Inventors: Hiroaki Matsumoto, Yokohama; Ikuo Sobue; Seishi Ejiri, both of Kawasaki; Masao Kiguchi, Yokohama; Haruo Ishizuka, Kawasaki; Yasuhiro Matsumoto, Yokohama; Yoshiyuki Nakayama, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,999

(22) Filed: May 14, 1997

Related U.S. Application Data

(63) Continuation of application No. 08/281,554, filed on Jul. 28, 1994, now abandoned.

(30) Foreign Application Priority Data

| Jul. 31, 1993 | (JP) | 5-208749 |
| Jul. 31, 1993 | (JP) | 5-208754 |
| Dec. 6, 1993 | (JP) | 5-340014 |
| Dec. 6, 1993 | (JP) | 5-340019 |

(51) Int. Cl.[7] .................................................. H04N 1/32
(52) U.S. Cl. .................... 358/468; 358/401; 399/403; 399/405
(58) Field of Search .................... 358/468, 400, 358/401, 402, 403, 449, 488; 355/321, 322, 323; 271/278, 279, 298; 399/403, 405

(56) References Cited

U.S. PATENT DOCUMENTS

| 4,854,572 | 8/1989 | Knight . |
| 4,995,602 | 2/1991 | Nakadai et al. . |
| 5,003,627 | 3/1991 | Wataya et al. . |
| 5,013,027 | * 5/1991 | Furukawa ............................. 271/290 |
| 5,050,860 | 9/1991 | Matsuo et al. . |
| 5,229,827 | 7/1993 | Sato et al. . |
| 5,237,382 | * 8/1993 | Matsumura ........................ 355/323 |
| 5,342,034 | * 8/1994 | Mandel et al. ....................... 270/53 |
| 5,358,328 | * 10/1994 | Mandel et al. ...................... 271/298 |

FOREIGN PATENT DOCUMENTS

| 57-136865 | 8/1982 | (JP) . |
| 58-089558 | 5/1983 | (JP) . |

(List continued on next page.)

Primary Examiner—Thomas D. Lee
(74) Attorney, Agent, or Firm—Fitzpatrick, Cella, Harper & Scinto

(57) ABSTRACT

An image communication apparatus includes a reception unit for receiving image data, a first controller for storing the image data received by the reception unit in a memory, and counting the page number the reception image data, a recording unit for recording an image on a sheet on the basis of the image data stored in the memory, a storage unit having a plurality of trays for sorting and storing sheets on which images are recorded by the recording unit, the plurality of trays having a first tray having a small sheet stackable number and a second tray having a large sheet stackable number, and a second controller for selecting the first tray when the page number counted by the first controller is equal to or smaller than a predetermined page number, and selecting the second tray when the counted page number is larger than the predetermined page number, thereby storing the sheets.

18 Claims, 28 Drawing Sheets

FOREIGN PATENT DOCUMENTS

| | | |
|---|---|---|
| 58-151770 | 9/1983 | (JP) . |
| 63-138883 | 6/1988 | (JP) . |
| 63-313182 | 12/1988 | (JP) . |
| 2-023157 | 1/1990 | (JP) . |
| 2-157578 | 6/1990 | (JP) . |
| 3-162365 | 7/1991 | (JP) . |
| 4-44075 | 2/1992 | (JP) . |
| 4-44076 | 2/1992 | (JP) . |
| 4-44077 | 2/1992 | (JP) . |
| 4-44078 | 2/1992 | (JP) . |
| 4-44079 | 2/1992 | (JP) . |
| 4-44080 | 2/1992 | (JP) . |
| 4-44081 | 2/1992 | (JP) . |
| 4-44082 | 2/1992 | (JP) . |
| 4-44083 | 2/1992 | (JP) . |
| 4-204980 | 7/1992 | (JP) . |
| 4-204981 | 7/1992 | (JP) . |
| 4-204982 | 7/1992 | (JP) . |
| 4-204983 | 7/1992 | (JP) . |
| 4-204984 | 7/1992 | (JP) . |

* cited by examiner

FIG. 17

| FIG. 17A |
|---|
| FIG. 17B |

FIG. 17A

BIN DESIGNATION RECEPTION (MAIL BOX) MODE

F = PAGE FULL FLAG

N = DISCHARGED PAPER NUMBER $N_{MAX}$ = MAXIMUM ALLOWABLE STORAGE NUMBER

1~# = BIN NUMBER

START
↓
SET ADDRESS FOR EACH BIN → $B_N : 2 \sim 10$
↓
BIN PAGE FLAG F
F ← φ → F = φ (NOT FULL)
↓
RECEPTION ? — NO → (C)
↓ YES
(* DESIGNATION OF MAIL POST FOR RECEPTION ?)

DESIGNATION OF ADDRESS ? — NO → (B)
↓ YES

F = φ ? — NO → (B)
↓ YES
(* COPY NUMBER PAGE FULL OF DESIGNATION BIN ?)
(A)

IMAGE COMMUNICATION APPARATUS HAVING MULTIPLE STORAGE UNITS AND CONTROL BASED ON DETECTED PAGE NUMBER

This application is a continuation of application Ser. No. 08/281,554, filed Jul. 28, 1994, now abandoned.

BACKGROUND OF THE INVENTION

1. Field of the Invention

The present invention relates to an image communication apparatus having a plurality of storage units for storing sheets on which reception images are recorded.

2. Related Background Art

A facsimile or image formation apparatus having a sorter is known.

However, sheets on which reception images are recorded as a large number of pages cannot be discharged on each bin tray in a conventional sorter due to a small stackable number, resulting in inconvenience.

More specifically, regardless of the number of received pages, sheets on which images are recorded are discharged on a designated bin tray. When the number of output sheets exceeds or is found to exceed the stackable number of this bin tray, the output is interrupted. Non-output information is preferably output to an adjacent bin tray. However, when this bin tray is full, sheets are output to any empty bin tray. If impossible, the transmitted information is stored in an image memory. In any case, a series of pieces of information are divided, resulting in complex handling of a reception document.

A confidential received image is recorded when a receiver inputs his password. Although the receiver is present near a facsimile apparatus, a recorded sheet is discharged to a bin tray which is not easily accessed by the receiver.

An image communication apparatus outputs a communication management report except for sheets of reception and copy images. However, a communication management report periodically output from the facsimile apparatus is useful for only a specific user. When one facsimile apparatus is shared by a plurality of users, this communication management report is left on the bin tray.

In a sorter having only a lead-through sensor (i.e., a sensor for detecting a specific one of a plurality of bin trays, which has a sheet therein), an image communication apparatus cannot detect that sheets are removed from the remaining bin trays if any sheet is present in any bin tray.

In an image communication apparatus of this type, although sheets of reception and copy images are removed from the bin trays, the communication management report such as a communication end report, an error message, or a memory transmission end report discharged on a bin tray tends to be left in this bin tray. When such a communication management report is discharged on a bin tray whose paper sheet is detected by a through sensor, the through sensor always detects the presence of a sheet due to the presence of the communication management report left in the bin tray although all the sheets of reception and copy images are removed. Therefore, sorter control may not be efficiently performed.

SUMMARY OF THE INVENTION

It is an object of the present invention to solve the conventional problems described above.

It is another object of the present invention to systematically operate such an apparatus when all the number of pages of the reception images exceeds a stackable number, reception image communication is confidential, or a recorded image is a communication report or the like.

The above and other objects, features, and advantages of the present invention will be apparent from the following detailed description of the preferred embodiments in conjunction with the accompanying drawings.

DETAILED DESCRIPTION OF THE PREFERRED EMBODIMENTS

The illustrative embodiments will be described below. An embodiment exemplifies a facsimile apparatus having a sorter.

Figure 1:
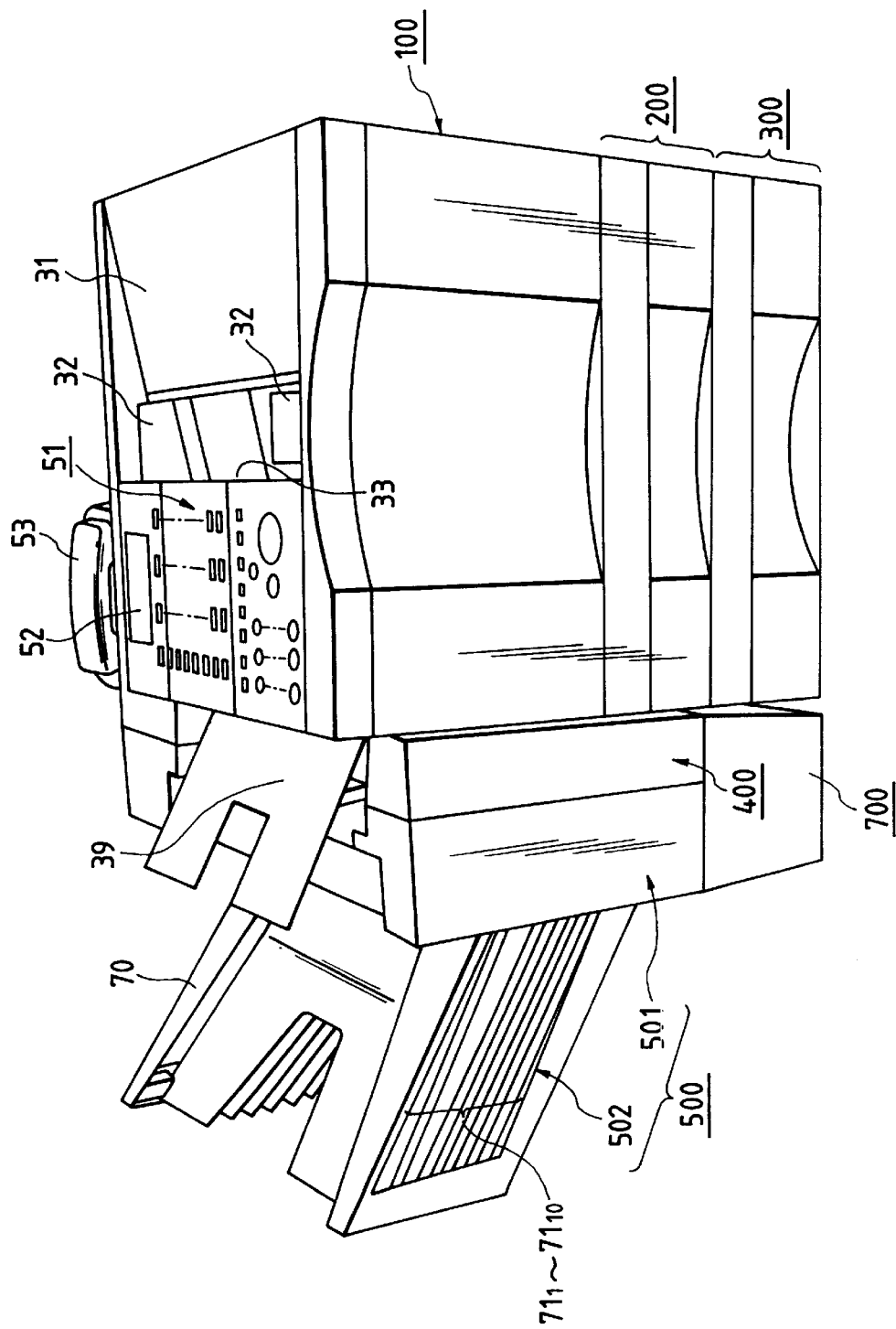
FIG. 1 is a perspective view showing the front outer appearance of a facsimile apparatus having a sorter.
Figure 2:
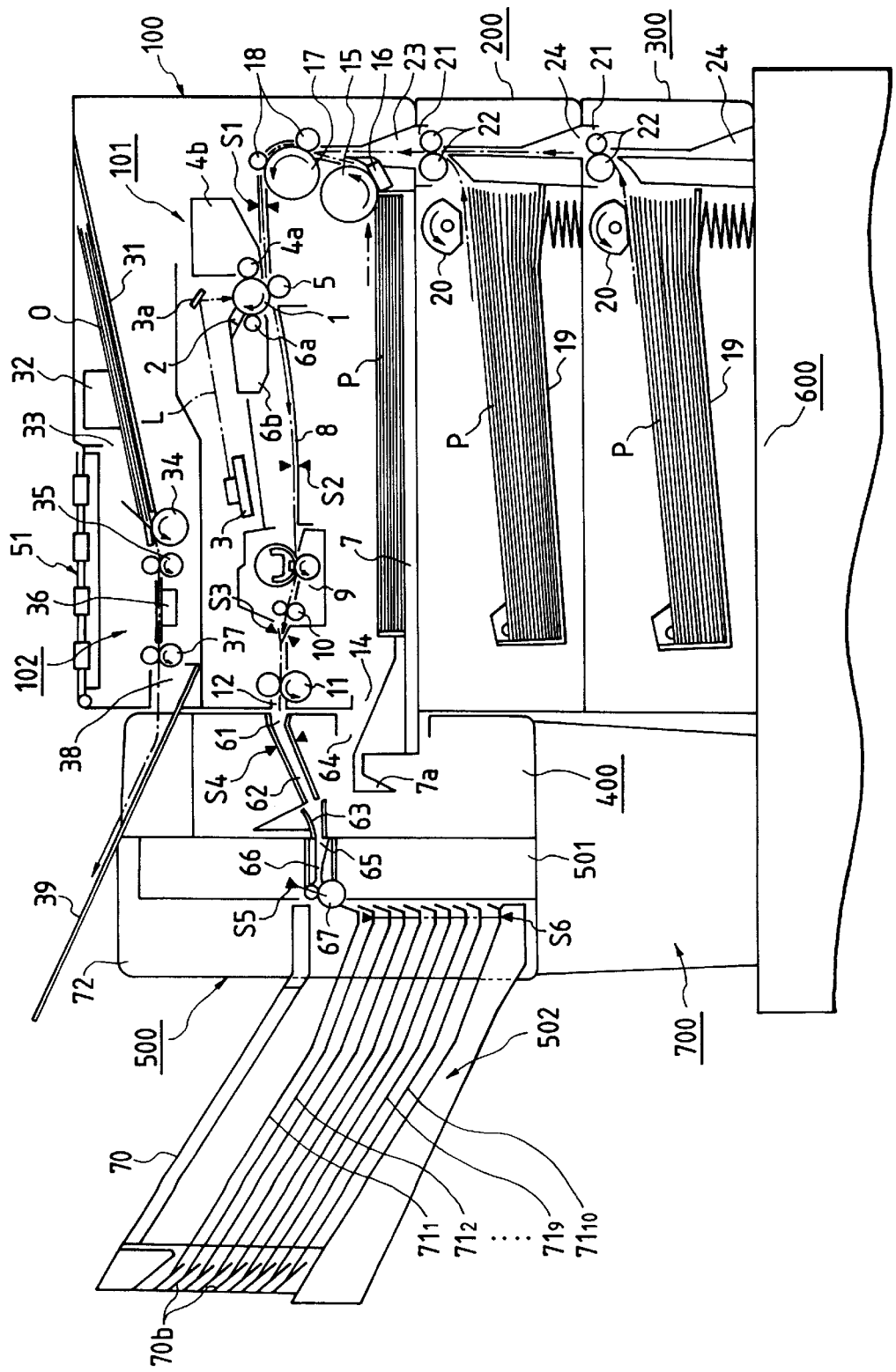
FIG. 2 is a longitudinal sectional front view showing the schematic internal structure of the facsimile apparatus in FIG. 1.

FIG. 1 is a perspective view showing the front outer appearance of the facsimile having the sorter, and FIG. 2 is a longitudinal sectional front view showing the schematic internal structure thereof.

The facsimile apparatus comprises a facsimile main body 100, first and second paper feeding units 200 and 300 optionally combined with the facsimile main body 100, a sorter 500 connected to the facsimile main body 100 through an adapter 400, and a pedestal 600 (FIG. 2) mounted with the facsimile main body 100, the first and second paper feeding units 200 and 300, the adapter 400, and the sorter 500. The facsimile apparatus further includes a base 700 interposed between the upper surface of the pedestal 600 and the lower surface of the adapter 400 and the sorter 500.

The first and second paper feeding units 200 and 300 are optional units appropriately combined with the facsimile main body 100. The first and second paper feeding units 200 and 300 are vertically stacked, and the facsimile main body 100 is mounted on the stacked units 200 and 300, so that these constituent units are combined with each other.

The sorter 500 is connected to the facsimile main body 100 through the adapter 400 on the sheet (recording paper or copy) discharge side of the facsimile main body 100. The controllers of the facsimile main body 100, the first and second paper feeding units 200 and 300, and the sorter 500 are electrically connected to each other through electrical adapters, so that information can be exchanged therebetween. The pedestal 600 is an installation base for the facsimile main body 100, the first and second paper feeding units 200 and 300, and the adapter 400. The base 700 is a member filled in a space formed between the upper surface of the pedestal 600 and the lower surface of the adapter 400 and the sorter 500.

A. Facsimile Main Body 100

The facsimile main body 100 mainly comprises a printer unit 101 (FIG. 2), an original reading apparatus 102, and a controller.

(a) Printer Unit 101

The printer unit 101 is a laser printer mechanism for a transfer type electrophotographic process in the apparatus of this embodiment.

More specifically, an drum type electrophotographic photosensitive body (to be referred to as a photosensitive drum hereinafter) 1 serves as an image carrier. The photosensitive drum 1 is rotated and driven in a counterclockwise direction indicated by an arrow at a predetermined peripheral velocity (process speed). When the outer surface of the rotating photosensitive drum 1 is subjected to uniform primary charge to a predetermined polarity at a predetermined potential by a charger 2. The charged surface is raster-scanned and exposed with a laser beam L output from a laser scanner 3 and modulated in correspondence with a time-series electrical digital pixel signal of target image information. A latent image corresponding to the target image information is formed on the entire outer surface of the rotating photosensitive drum 1. A mirror 3a is used to deflect the output laser beam L from the laser scanner 3 toward the photosensitive drum 1 surface.

The latent image formed on the surface of the photosensitive drum 1 is visualized as a toner image by a developing unit 4a. A toner is stored in a toner tank 4b. The toner image is sequentially transferred to a recording sheet (transfer sheet) P fed from a paper feeding cassette 7 (paper feeding unit) incorporated in the printer unit 100 or from the first or second paper feeding unit 200 or 300 to a transfer portion between the photosensitive drum 1 and a transfer unit 5.

The sheet P to which the toner image is transferred at the transfer portion is separated from the surface of the photosensitive drum 1 and passes through a convey unit 8. The sheet P is then guided to an image fixing unit 9 and subjected to a fixing process of the toner image.

The sheet P whose image is fixed by the fixing unit 9 passes through a fixing/discharge roller pair 10 (convey rotary bodies), discharge roller pair 11 (discharge rotary bodies), and a discharge port 12 (discharge portion) and is discharged from the facsimile main body 100 to the sorter 500 through the adapter 400.

Figure 3:
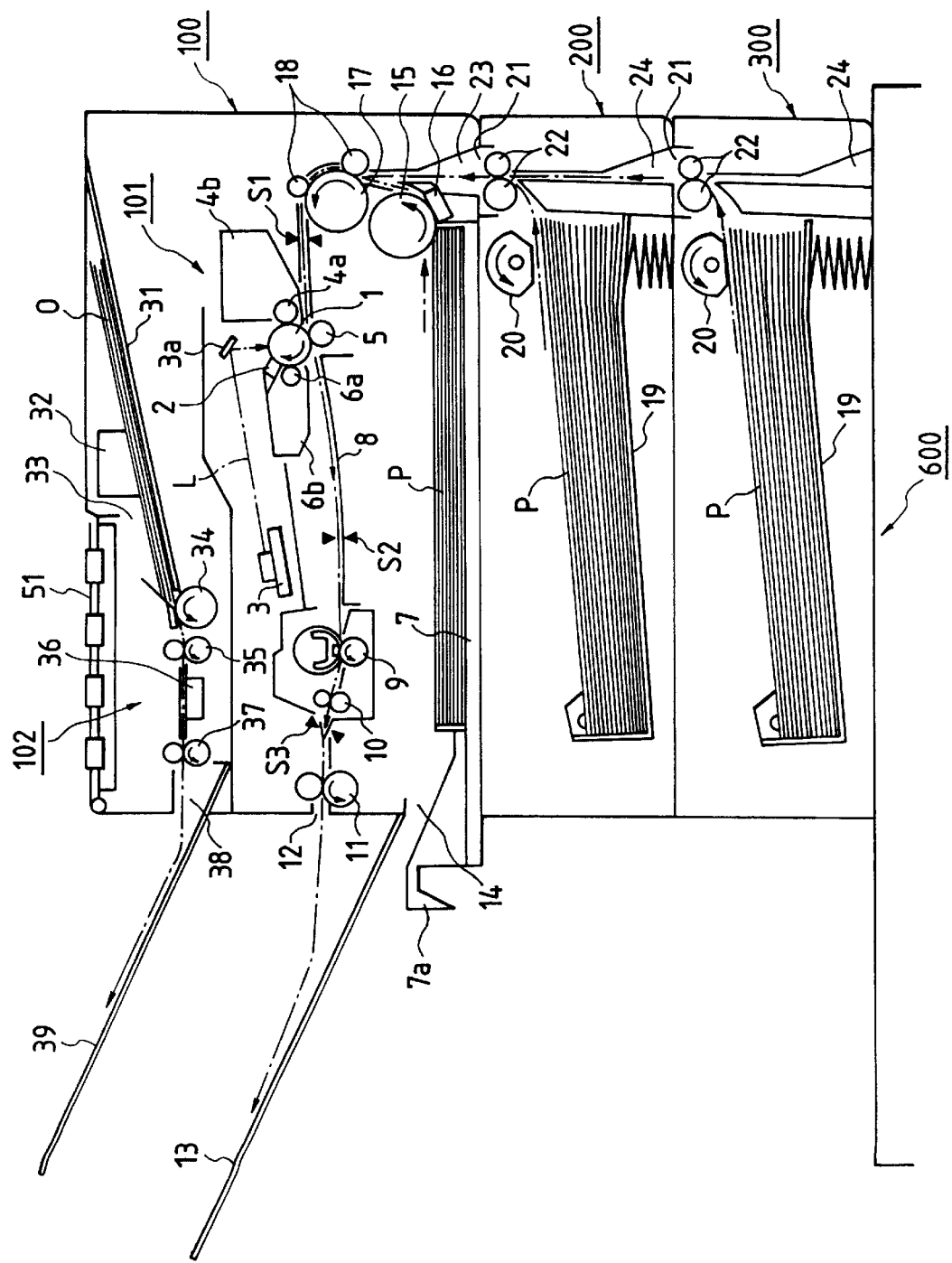
FIG. 3 is a longitudinal sectional front view of a facsimile apparatus having no sorter.

When the facsimile main body 100 is not combined with the sorter 500, a paper discharge tray 13 is detachably mounted on the discharge port 12 of the facsimile main body 100, as shown in FIG. 3. Therefore, the sheet is discharged onto the paper discharge tray 13.

Upon transfer of the toner image to the recording sheet P, the residual materials such as a residual toner on the surface of the photosensitive drum 1 are removed and cleaned by a cleaning unit 6a. The surface of the photosensitive drum 1 can be repeatedly used for image formation. A waste toner is stored in a waste toner tank 6b.

In the facsimile main body 100 of this embodiment, the four image formation process devices, i.e., the photosensitive drum 1, the charger 2, the developing unit 4a (and the toner tank 4b), and the cleaning unit 6a (and the waste toner tank 6b) of the printer unit 101 are constituted as a process cartridge detachably mounted on a predetermined portion of the facsimile main body 100.

The image fixing unit 9 uses a film heating type image heating/fixing unit. In the fixing unit of this type, a sheet having a nonfixed toner image as a to-be-heated material is brought into tight contact with the surface of a heating body through a heat-resistant film, and the sheet is conveyed together with the heat-resistant film, thereby applying the heat from the heating body to the sheet through the heat-resistant film, thereby thermally fixing the toner image, as disclosed in Japanese Laid-Open Patent Application Nos. 63-313182, 2-157878, 4-44075 to 4-44083, and 4-204980 to 4-204984.

The film heating type fixing unit can use a thin film having a small heat capacity, i.e., the heating body having a small heat capacity as the heating body, as compared with, e.g., a heat roller type fixing unit. For this reason, energy saving can be achieved, and the waiting time can be shortened (quick start characteristics). Since the quick start can be achieved, preheating during nonfixing operation need not be performed, and total energy saving can be achieved. As another advantage, a temperature rise in the apparatus can be suppressed.

Figure 4:
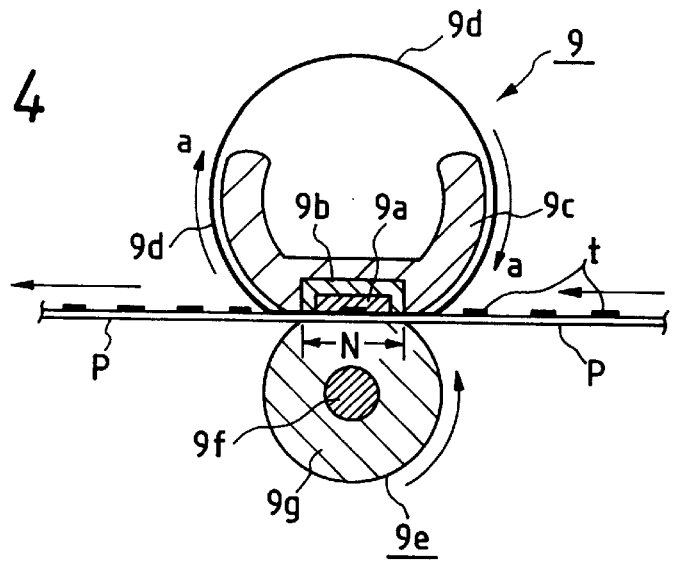
FIG. 4 is a schematic view showing a film heating type image heating/fixing unit used in the facsimile apparatus.

FIG. 4 shows the schematic structure of the tensionless film heating type image heating/fixing unit 9 in which a cylindrical film is used as a heat-resistant film, and this film is rotated and driven by a press roller.

This unit comprises a heating section and a press roller 9e. The heating section comprises the following basic constituent members, i.e., a heating body 9a, an inner film surface guide member 9c held on the lower surface of the heating body 9a through a heat-insulating material 9b, and a cylindrical (like an endless belt) heat-resistant film (fixing film) 9d loosely fitted on the inner film surface guide member 9c. The press roller 9e serves as a press section for pressing the film 9d against the heating body 9a.

The heating body 9a comprises a ceramic heater having a small heat capacity and having an elongated planar shape having a longitudinal direction perpendicular to a rotational direction a of the cylindrical fixing film 9d or the convey direction of the sheet P serving as the to-be-heated material.

The inner film surface guide member 9c is a member elongated in the horizontal direction, consisting of a heat-resistant resin or the like, and having a barrel-shaped arcuated cross-section. The inner film surface guide member 9c has a longitudinal direction perpendicular to the rotational direction a of the cylindrical fixing film 9d or the convey direction of the sheet P serving as the to-be-heated material. The two end portions of the guide member 9c are fixed and supported between side plates of the frame of the apparatus. The heating body 9a is fitted through the heat-insulating material 9b in a groove formed at almost the central portion of the lower surface of the inner film surface guide member 9c along its longitudinal direction and is fixed therein with a heat-resistant adhesive. The inner film surface guide member 9c itself may consist of a heat-resistant, heat-insulating material, and the heat-insulating material 9b may be omitted.

The energization electrodes (not shown) at the two end portions of the ceramic heater 9a serving as the heating body are energized from an AC energization circuit (not shown) to increase the temperature of a region having an effective length. The heater temperature is detected by a heat-sensitive element such as a thermistor (not shown), and its detection temperature information is fed back to a controller (not shown) to control energization to the heater 9a such that a detection temperature output from the heat-sensitive element becomes a predetermined output. That is, the heater 9a is energized such that the temperature of the heater 9a is maintained at a predetermined fixing temperature.

The fixing film 9c is a heat-resistant film material having a thickness of 50 $\mu$m. This film is obtained using, e.g., a polyimide film as a base and forming mold releasing layers as of PFA on the outer surfaces of the base.

The press roller 9e comprises a core 9f and a heat-resistant elastic layer 9g consisting of silicone rubber or the like.

The press roller 9e presses the fixing film 9d against the ceramic heater 9a serving as the heating body at a predetermined urging force using a compression spring (not shown), thereby forming a pressure nip portion (fixing nip portion) N having a predetermined width.

The press roller 9e is rotated and driven counterclockwise, as indicated by an arrow, by a drive system (not shown). A rotational force is applied to the cylindrical fixing film 9d in accordance with a frictional force between the rotating press roller 9e and the outer surface of the fixing film 9d. The fixing film 9a is rotated and driven in a clockwise direction a around the inner film surface guide member 9c while the inner surface of the fixing film 9d is brought into slidable contact with the surface of the heater 9d at the fixing nip portion N.

The inner film surface guide member 9c can facilitate rotation of the fixing film 9d and regulates the movements in the circumferential and longitudinal directions of the rotating fixing film 9d, thereby preventing unnecessary variations and shift of the film.

In a state wherein the fixing film 9d is rotated by rotation and driving of the press roller 9e and the ceramic heater 9a serving as the heating body is temperature-controlled to a predetermined fixing temperature, the sheet P serving as the to-be-heated material having a nonfixed toner image t is guided from the image formation mechanism to the apparatus. The sheet P is inserted between the film 9d and the press roller 9e at the fixing nip portion N formed between the heater 9a and the press roller 9e through the film 9d. The sheet is brought into tight contact with the outer surface of the rotating fixing film 9d and is conveyed together with the film 9d and the fixing nip portion N. Heat from the heater 9a is applied to the sheet P through the film 9d, and the nonfixed toner image t on the sheet P is heated and fixed on the sheet P surface. The sheet P passing through the fixing nip portion N is separated from the surface of the surface of the film 9d and conveyed.

The paper feeding cassette 7 incorporated in the facsimile main body 100 is located below the printer unit 101 and can be detachably mounted on the facsimile main body 100 from a mounting port 14 formed in the lower side wall portion on the discharge side of the facsimile main body 100. The cassette 7 has a handle portion 7a.

When a paper sheet is fed from this paper feeding cassette 7, a paper feeding roller 15 is rotated and driven to separate the uppermost sheet of the sheets P stored in the cassette 7 in cooperation with a separating member 16. The uppermost sheet is picked up and fed in a direction on the side opposite to the discharge side of the facsimile main body. The sheet is then guided upward by sheet guides. The sheet is returned by a U turn to the transfer portion by a turn roller 17 and a press roller 18.

A sheet sensor S1 is arranged midway along a sheet path between the turn roller 17 and the transfer portion 5. When the leading end of the sheet P conveyed by a U turn from the turn roller 17 to the transfer unit is detected, sheet conveyance is temporarily stopped. Conveyance is synchronized with the progress of image formation process on the photosensitive drum 1. When the leading end of the toner image portion on the surface of the photosensitive drum 1 is synchronized with the leading end of the sheet P, sheet conveyance is restarted at the transfer portion. The sheet P is fed to the transfer portion.

A sheet sensor S2 is arranged midway along a sheet path of the convey portion 8, and a sheet sensor S3 is arranged at the sheet outlet side of the fixing/discharge roller pair 10.

(b) Original Reading Apparatus 102

An original support portion (paper feeding unit) 31 is inclined obliquely in the lower left direction and mounted on the upper surface of the facsimile main body 100. Movable side guides 32 regulate the two sides of an original O placed on the original support portion 31.

The image surface of the original O faces downward on the original support portion 31, and the leading end portion of the original O is sufficiently inserted into the facsimile main body from an original insertion port 33 until the leading end portion is stopped by a stopper (not shown). The two movable side guides 32 are manually moved to regulate the width of the originals stacked and set on the original support portion 31.

A single original separating/feeding means 34 is operated on the basis of an original reading start signal, and the lowermost original O is separated and fed into the facsimile main body. The original is then discharged onto a discharge tray 38 (discharge portion) after being conveyed through the first convey roller pairs 35, a second convey roller pair 37, and a discharge port 38 at a predetermined speed.

During conveyance of the original O between the first and second convey roller pairs 35 and 37, the image surface of the original O which faces downward is sequentially read as a time-series electrical digital pixel signal by a photoelectric image reading element array 36 arranged between the roller pairs 35 and 37.

In a facsimile transmission mode, the read image information is transmitted to a partner facsimile apparatus.

In a copy mode, the printer unit 101 is operated to output the laser beam L modulated in correspondence with the time-series electrical digital pixel signal as the original read image information from the laser unit 3. An image is formed as a copy at the printer unit 101.

In a reception mode, transmission information is stored in a memory of a control system and received from a partner (transmission source) facsimile apparatus. The printer unit 101 is operated to read out the reception information from the memory, and the laser beam L modulated in correspondence with the time-series electrical digital pixel signal as reception information is output from the laser unit 3. An image is formed as reception recording at the printer unit 101.

The original reading apparatus 102 is located above the printer unit 101, as can be apparent from FIG. 2, and the discharge portions of the original reading apparatus 102 and the printer unit 102 face in the same direction.

(c) Controller

The controller of the printer unit 100 has a circuit board located at an appropriate position in the printer unit. An operation panel 51 is located on the upper surface of the facsimile main body. The single original separating/feeding means 34, the first convey roller pair 35, the photoelectric image reading element array 36, the second convey roller pair 37, and the like of the original reading apparatus 102 are located below the operation panel 51. A handset 53 in FIG. 1 is located next to the operation panel 51.

Figure 5A:
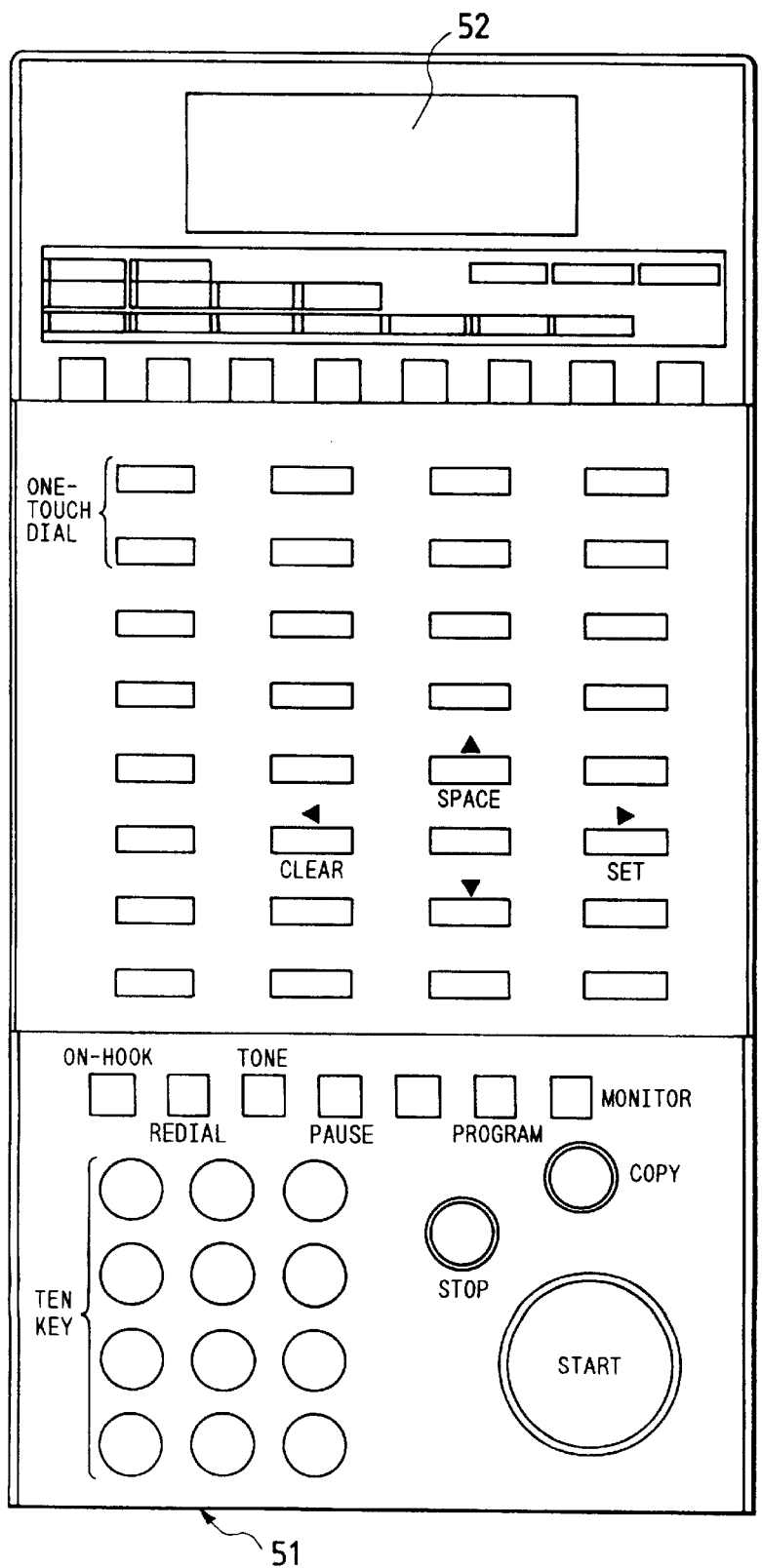
FIGS. 5A and 5B are an enlarged plan view and a side view, respectively, showing an operation panel.
Figure 5B:
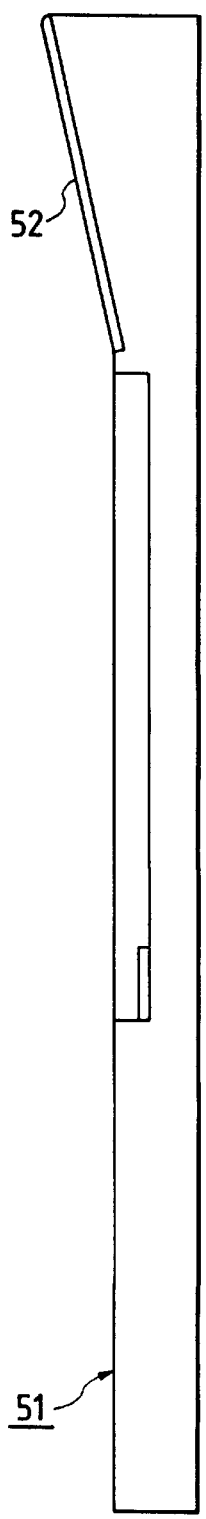

FIGS. 5A and 5B are an enlarged plan view and a side view, respectively, showing the operation panel 51. This operation panel 51 has a liquid crystal display 52 (i.e., an LCD) for displaying various types of messages, various operation keys (buttons), and function keys. Using these keys, various types of predetermined information and a control mode can be designated or set and input to the controller.

B. First and Second Paper Feeding Units 200 and 300

(1) The first and second paper feeding units 200 and 300 are of a stacking type. In this embodiment, these are used in a double stacked state, and the facsimile main body 100 is mounted thereon.

The paper feeding units 200 and 300 are identical units. Each unit is a so-called front loading unit capable of allowing an operator to pull a paper feeding cassette 19 toward the front surface side of the apparatus and replenish the unit with sheets P.

(2) When paper feeding is to be performed from the upper paper feeding unit, i.e., the first paper feeding unit 200, a paper feeding roller 20 in the unit 200 is rotated and driven to separate only the uppermost sheet of the sheets P stored in the paper feeding cassette 19 in cooperation of a separating member (not shown). The uppermost sheet is fed in a direction opposite to the discharge side of the facsimile main body 100. The sheet is then guided upward by sheet guides. The sheet is inserted into a sheet reception port 23 opposing a discharge port 21 from an opening formed in the upper surface plate of the unit 200 by a discharge roller pair 22 at the discharge port 21. The sheet is then conveyed upward in the facsimile main body 100 and is returned by a U turn to the transfer unit by the turn roller 17 and the press roller 18.

(3) When paper feeding is to be performed from the lower paper feeding unit, i.e., the second paper feeding unit 300, a paper feeding roller 20 in the unit 300 is rotated and driven to separate the uppermost sheet of the sheets P stacked in a paper feed cassette 19 in the unit 300 in cooperation of a separation member (not shown). The uppermost sheet is fed in a direction opposite to the discharge side of the facsimile main body 100. The sheet is then guided upward by the sheet guides. The sheet is guided from the discharge port 21 by the discharge roller pair 22 into the sheet reception port 24 opposing the discharge port 21 and formed in the bottom surface plate of the first paper feeding unit 200. The sheet is then conveyed upward in the first paper feeding unit 200. The sheet is returned to the transfer portion by a U turn through the discharge roller pair 22 of the first paper feeding unit 200, the sheet reception port 23 on the side of the facsimile main body 100, and the path between the turn roller 17 and the press roller 18.

C. Adapter 400

The sorter 500 is connected to the discharge side of the facsimile main body 100 through the adapter.

The adapter 400 has, on a side opposite to the facsimile main body, an inlet portion 61 for receiving a sheet discharged from the facsimile main body 100, and an opening 64 for receiving the handle portion 7a to avoid interference with the handle portion 7a of the paper feeding cassette 7 incorporated in the facsimile main body 100, which externally projects from the discharge side of the facsimile main body 100. The adapter 400 also has a sheet outlet portion 63 on a side opposite to the sorter, and a sheet path 62 through which the sheet inlet portion 61 communicates with the sheet outlet portion 63.

A sheet sensor (sheet passage detector BPS) S4 detects that a sheet is discharged from the facsimile main body 100 into the sheet path 62 of the adapter 400.

After the paper discharge tray 13 (FIG. 3) is removed from the facsimile main body 100, the sheet inlet portion 61 is caused to oppose the discharge port 12 of the facsimile main body 100. At the same time, the adapter 400 is attached to the paper discharge side of the facsimile main body 100 while the handle portion 7a externally projecting from the paper feeding cassette 7 is inserted in the adapter 400 through the opening 64. Using a fastening means such as a hook mechanism (not shown), or a locking means such as a screwing means, the adapter 400 is firmly mechanically connected to the discharge side of the facsimile main body 100.

The upper portion of the adapter 400 is recessed and retreated from an original discharge tray 39 not to interfere with the original discharge tray 39 of the facsimile main body 100.

Since the facsimile main body 100 (printer unit) is connected to the sorter 500 through the adapter 400, any type of machine can be used, thereby increasing the flexibility.

In this embodiment, all the constituent members of the adapter 400 are formed of a transparent material, or a cover with a transparent part is provided. With this arrangement, a sheet jam in the sheet path 62 can be easily visually confirmed.

D. Sorter 500

The sorter 500 has a drive unit 501, and a bin tray unit 502 vertically moved by the drive unit 501.

The drive unit 501 has, on a side opposite to the adapter 400, an inlet portion 65 for receiving a sheet discharged from the sheet outlet portion 63 of the adapter 400. The drive unit 501 has, on a side opposite to the bin tray unit 502, a discharge roller pair 67 (sheet guide port). A sheet at the inlet portion 65 reaches the discharge roller pair 67 through a sheet path 66. A sheet sensor S5 (sorter inlet sensor) is disposed at the position of the discharge roller pair 67.

The drive unit 501 also incorporates a bin tray unit vertical drive mechanism, a controller, and the like (to be described later).

The sorter 500 is connected to the facsimile main body 100 through the adapter 400 such that the sheet inlet portion 65 of the unit is caused to oppose the sheet outlet portion 63 of the adapter 400 and firmly connected to the adapter 400 by a locking means (not shown).

Figure 6:
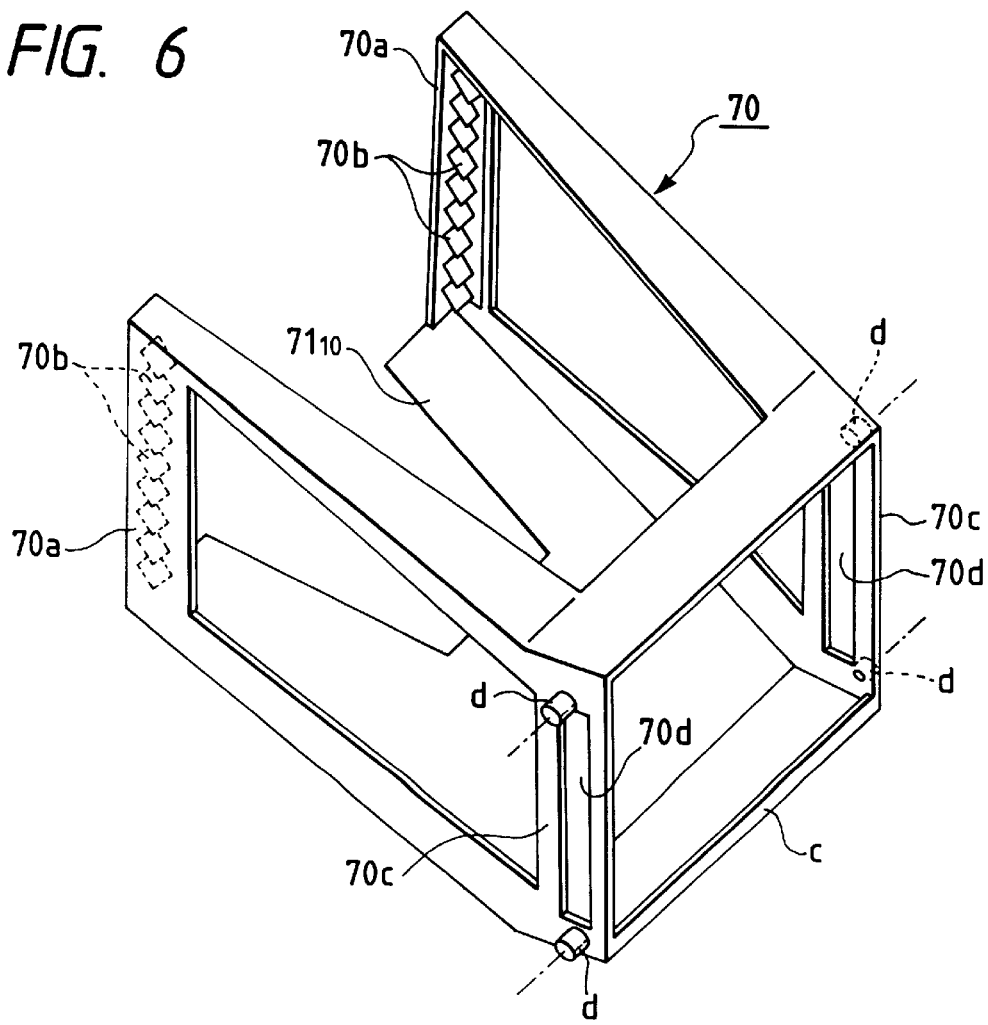
FIG. 6 is a perspective view showing a bin tray accommodation frame for a bin unit.

The bin tray unit 502 has a plurality of bin trays vertically stacked in a substantially parallelepiped frame 70, as shown in FIG. 6. In this embodiment, a total of ten bin trays (to be referred to as bins hereinafter) $71_1$ to $71_{10}$ are arranged in the bin tray unit 502.

In this embodiment, the bin $71_1$ as the uppermost bin is referred to as the first bin. The lower bins are sequentially referred to as the second, third, . . . , tenth bins.

In this embodiment, the tenth bin $71_{10}$ as the lowermost bin is fixed to the bin tray unit frame 70, as shown in FIG. 6. As shown in the plan view in FIG. 8, each of the first to ninth bins $71_1$ to $71_9$ has externally projecting front and rear tongue portions a on its distal-end side (a side on the downstream side of the sheet discharge direction), and externally projecting front and rear rollers (followers) b are axially mounted on its proximal-end side (a side on the upstream side of the sheet discharge direction). An upward bent edge c is provided to the proximal-end side of each bin.

Figure 8:
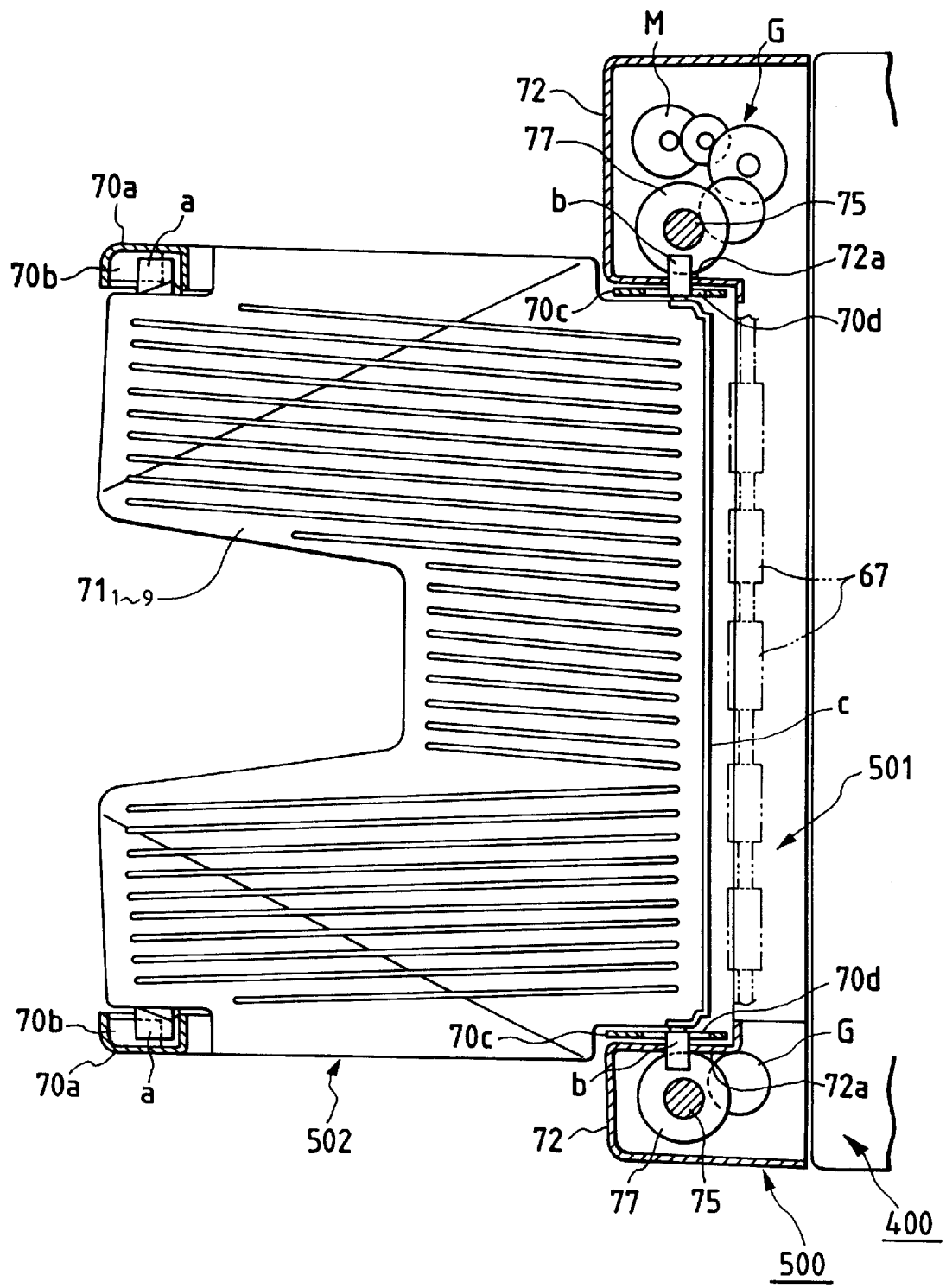
FIG. 8 is a cross-sectional plan view of the sorter.

The first to ninth bins are supported such that the front and rear tongue portions a on the distal-end side are received by corresponding receiving plates 70b vertically arranged at a predetermined interval inside front and rear vertical frame plates 70a of the bin tray unit frame 70. The front and rear rollers b on the proximal-end side are fitted in vertical slit holes 70d formed in front and rear vertical frame plates 70c on the proximal-end side of the bin tray unit frame 70, thereby projecting the distal-end sides of the rollers b outside the vertical frame plates 70c, as shown in FIG. 8. With this arrangement, the bins $71_1$ to $17_9$ are vertically stacked in the frame 70.

Figure 9:
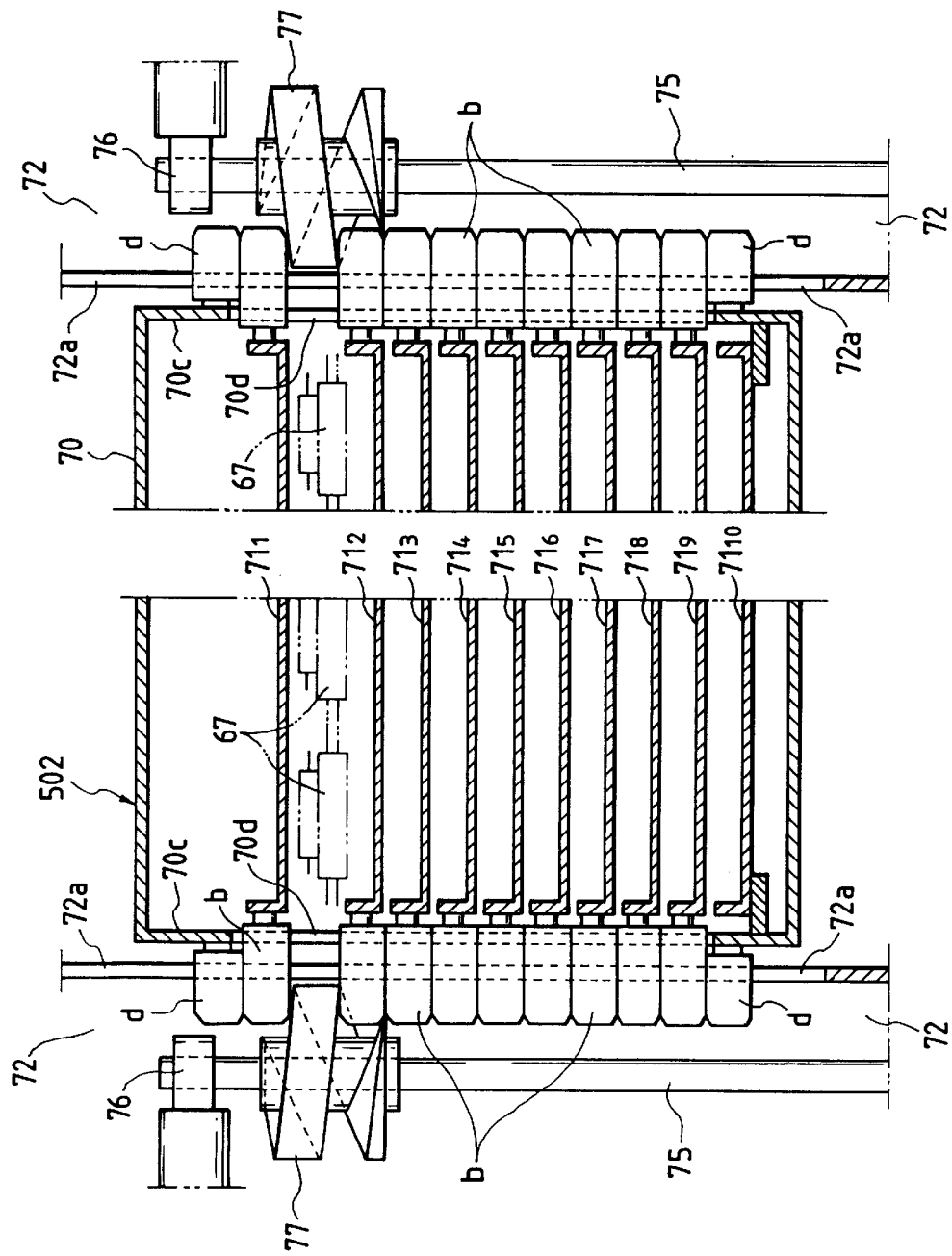
FIG. 9 is a longitudinal sectional front view of a bin tray unit.

As shown in FIGS. 6 and 9, rollers (followers) d are axially mounted at the upper and lower end portions of the vertical slit holes 70d outside the vertical frames 70c. Each slit hole 70d has a width larger than the outer diameter of the roller b or d (FIG. 8).

Figure 7:
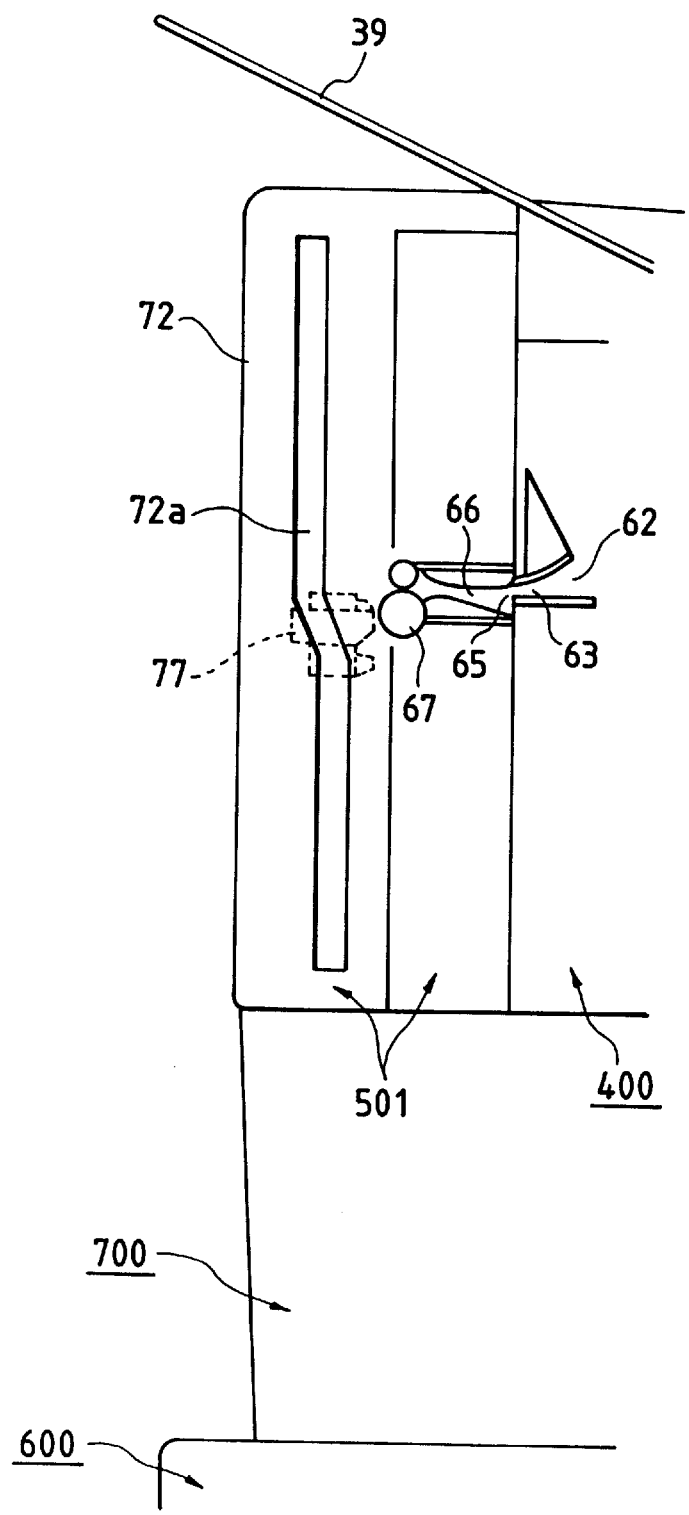
FIG. 7 is a longitudinal sectional side view of a sorter drive unit.

Vertical slit holes 72a are symmetrically formed in the opposing inner walls of front and rear hollow vertical frame portions 72 of the sorter drive unit 501, as shown in FIG. 7. The width of each slit hole 72a is substantially as large as the outer diameter of the roller b or d.

As shown in FIG. 7, the slit hole 72a is constituted by a vertical slit hole portion vertically extending from the lower end side to a portion near the discharge roller pair 67, a bent slit hole portion continuously extending from the vertical slit hole portion and obliquely bent at the horizontal portion of the discharge roller pair 67 in a direction to be separated from the discharge roller pair 67, and a vertical slit hole portion continuously and vertically extending upward from the bent slit hole portion.

The proximal-end side of the bin tray unit 502 having the bins $71_1$ to $71_{10}$ stacked in the frame 70 is attached between the front and rear vertical frame portions 72 of the drive unit 501. The rollers b and d externally projecting from the front and rear vertical frame plates 70c on the proximal-end side of the bin tray unit 502 are fitted in the vertical slit holes 72a formed in the inner walls of the vertical frame portions 72, as shown in FIGS. 8 and 9, thereby mounting the bin tray unit 502 between the front and rear vertical frame portions 72 of the drive unit 501.

The bin tray unit 502 is vertically moved by a vertical movement mechanism provided to the drive unit 501. More specifically, as shown in FIGS. 8 and 9, lead cam shafts 75 each having its upper and lower end portions held by bearings are vertically disposed in the front and rear hollow vertical frames 72 of the drive unit 501. Referring to FIG. 9, a bearing 76 holds the upper end portion of each lead cam shaft 75.

Lead cams (spiral cams) 77 engaged with the front and rear rollers b or d of the bin tray unit 502 are fixed and supported at the upper ends of the lead cam shafts 75. These lead cams 77 are located at a level almost the same as that of the discharge roller pair 67 of the drive unit 501, as shown in FIGS. 7 and 9.

Referring to FIG. 8, a reversible motor (shift motor) M is arranged on the bottom portion of the rear hollow vertical frame 72 of the drive unit 501. The forward/reverse rotation force of the motor M is transmitted to the rear and front lead cam shafts 75 through a power transmission system G such as a gear train or a sprocket and chain mechanism (not shown), thereby driving the lead cam shafts 75, i.e., the lead cams 77 in the forward or reverse direction.

As for the lead cams 77, the forward direction is a direction to sequentially move the rollers b of the bins upward, and the reverse direction is a direction to sequentially move the rollers b downward.

When the lead cams 77 are driven in the forward direction by one revolution, the rollers b of the bins are guided along the vertically elongated slit holes 72a and moved from the lower sides to the upper sides of the lead cams 77. The rollers b abut against the lower sides of the upper rollers d of the bin tray unit frame 70 or the lower sides of the rollers b of a bin which has been already moved upward. A lifting force acts to the upper rollers d to sequentially move the entire frame 70, i.e., the entire bin tray unit 502 upward by a distance corresponding to one roller, i.e., one bin against its weight.

To the contrary, when the lead cams 77 are driven in the reverse direction by one revolution, the rollers b of the bins are guided along the vertically elongated slit holes 72a and moved from the upper sides to the lower sides of the lead cams 77. With this operation, the rollers between the upper rollers d of the frame 70 and the lead cams 77 are decreased one by one, and the entire frame 70, i.e., the entire bin tray unit 502 is sequentially moved downward by a distance corresponding to one roller, i.e., one bin by its weight.

The lead cams 77 are located at almost the same level as that of the discharge roller pair 67, as described above. The proximal-end side of the bin corresponding to the rollers b immediately below the lead cams 77 is located at a position corresponding to the discharge roller pair 67, and the upper bin is moved upward by a lead distance of the lead cams 77. With this operation, an interval between the proximal-end side of the bin located at a position corresponding to the discharge roller pair 67 and that of the upper bin becomes larger than that between the remaining bins. Therefore, a sheet can be smoothly discharged by the discharge roller pair 67 in the bin located at a position corresponding to the discharge roller pair 67.

Figure 12:
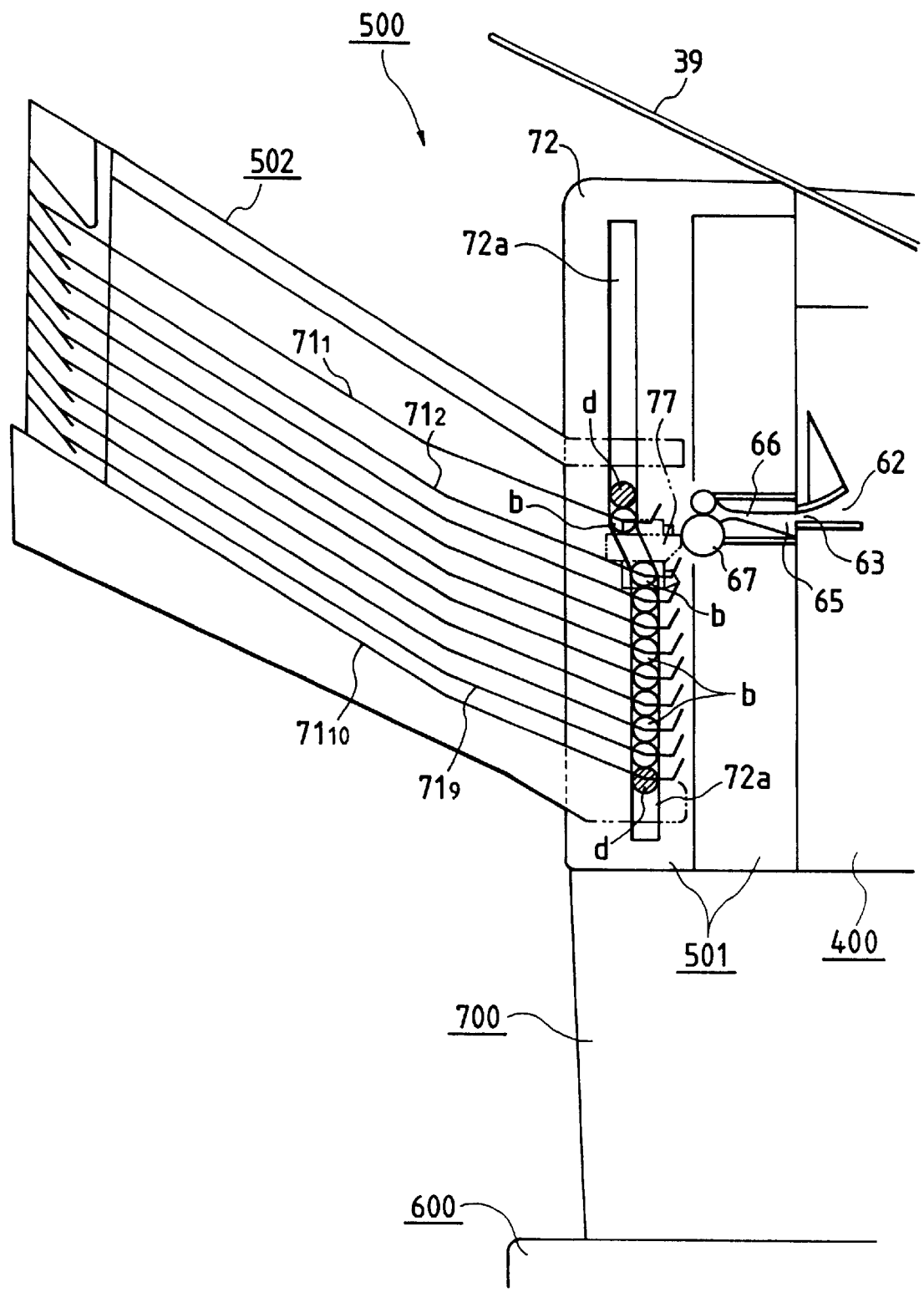
FIG. 12 is a view showing a state in which the second upper bin tray is located at a position corresponding to the discharge roller pair.
Figure 13:
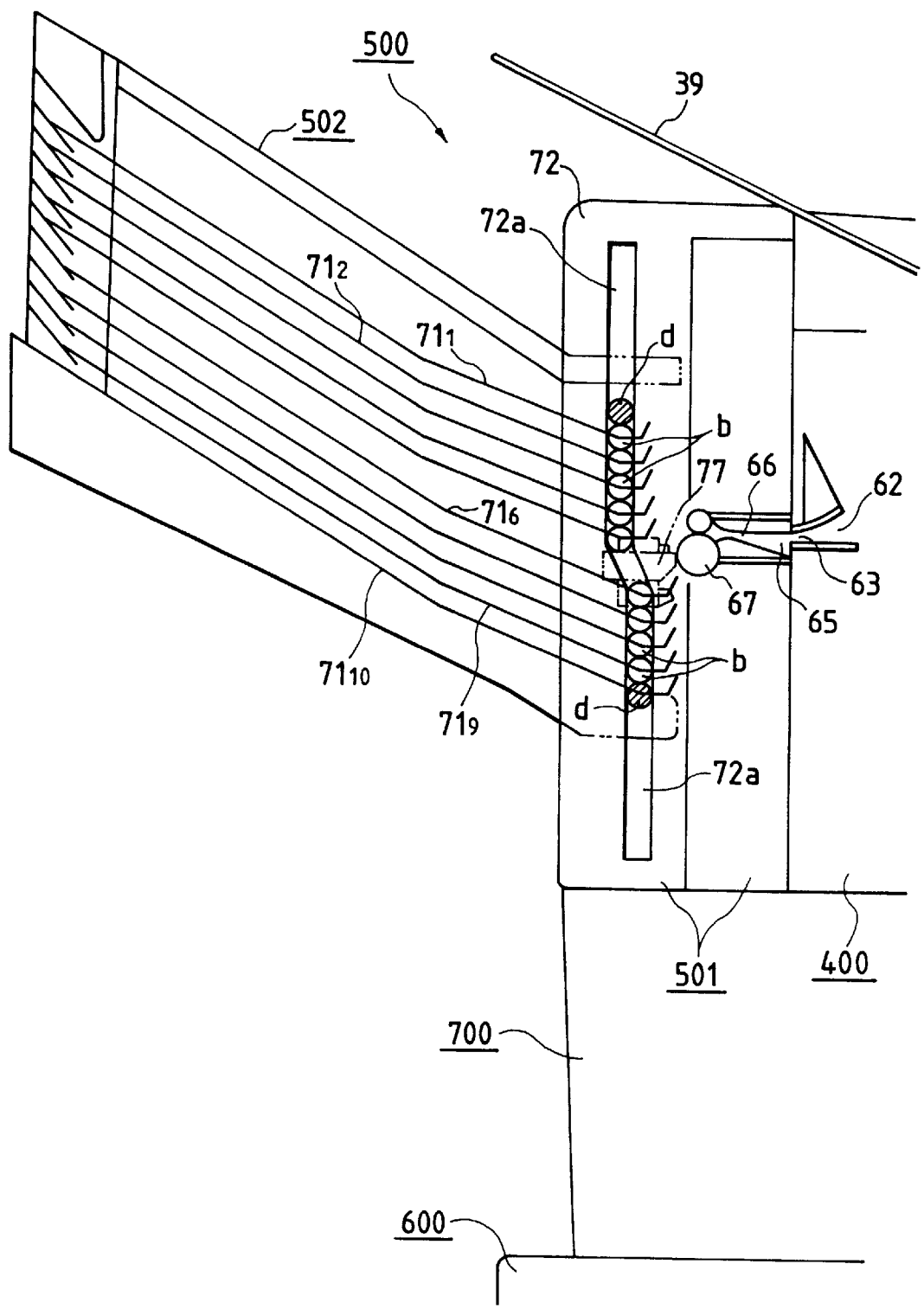
FIG. 13 is a view showing a state in which the sixth upper bin tray is located at a position corresponding to the discharge roller pair.
Figure 14:
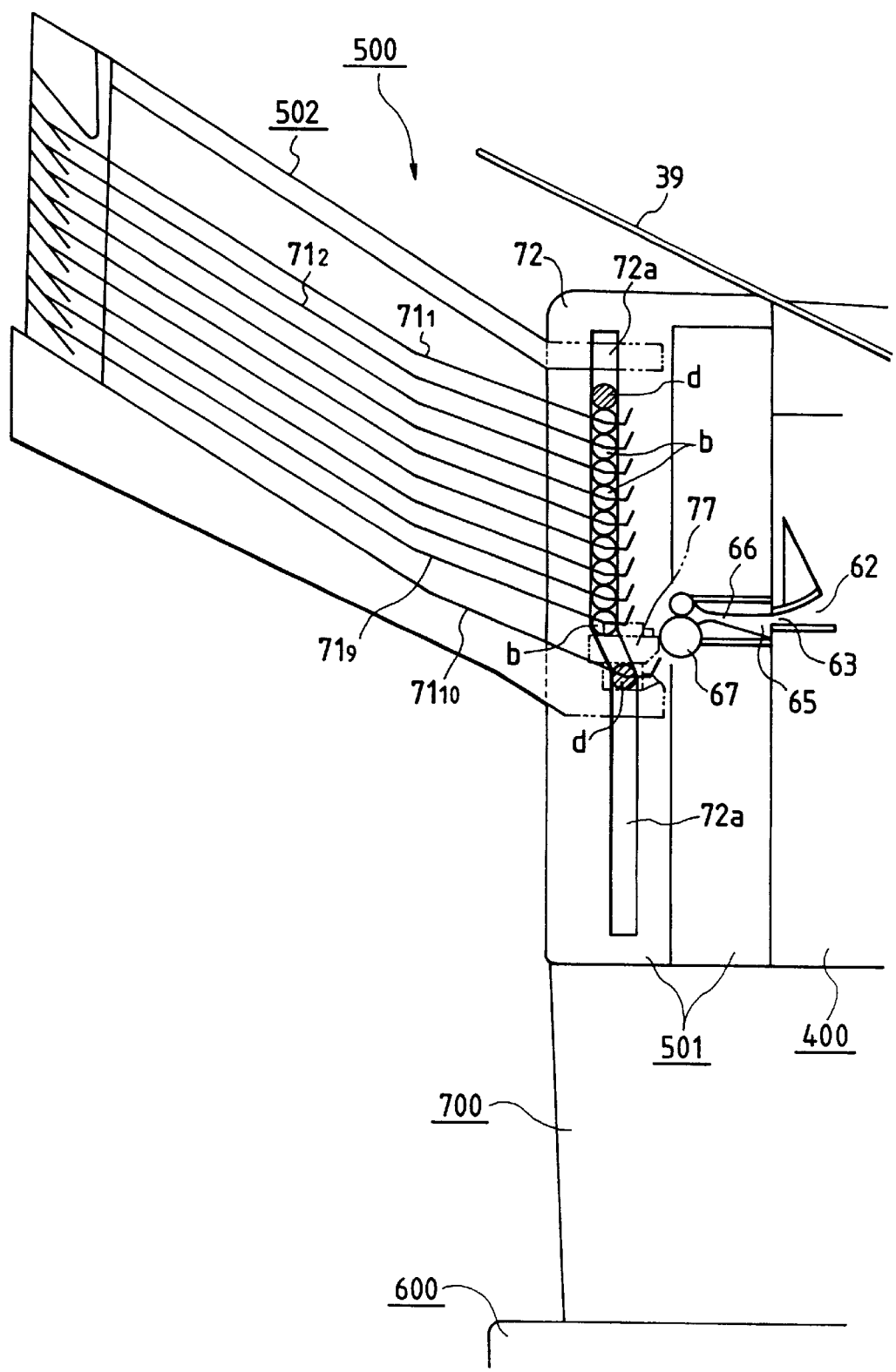
FIG. 14 is a view showing a state in which the lowermost bin tray is located at a position corresponding to the discharge roller pair.

In the apparatus of this embodiment, as described above (FIG. 7), the vertically elongated slit hole 72a for guiding each roller b of each bin is constituted by the vertical slit hole portion vertically extending from the lower end to a portion near the discharge roller pair 67, the bent slit hole portion continuously extending from the slit hole portion and obliquely bent at the horizontal position of the discharge roller pair 67 in the direction to be separated form the discharge roller pair 67, and the vertical slit hole portion continuously and vertically extending upward from the bent slit hole portion. With this structure, a bin moved above the lead cams 77 is moved in a direction to be separated from the discharge roller pair 67 as compared to the lead cams 77 and the lower bins. For this reason, the proximal-end side of the upper bin is moved forward with respect to the proximal-end side of a bin located at a position corresponding to the discharge roller pair 67. Since the opening on the proximal-end side of the bin located at a position corresponding to the discharge roller pair 67 becomes wide, a sheet can be smoothly discharged by the discharge roller pair 67 in this bin (FIGS. 12 to 14).

In this embodiment, the capacity of the first bin (uppermost bin) 71 as the uppermost bin is set to store 100 sheets, and the capacity of each of the second to tenth bins (intermediate bins) $71_2$ to $71_{10}$ is set to store 20 sheets.

Figure 10:
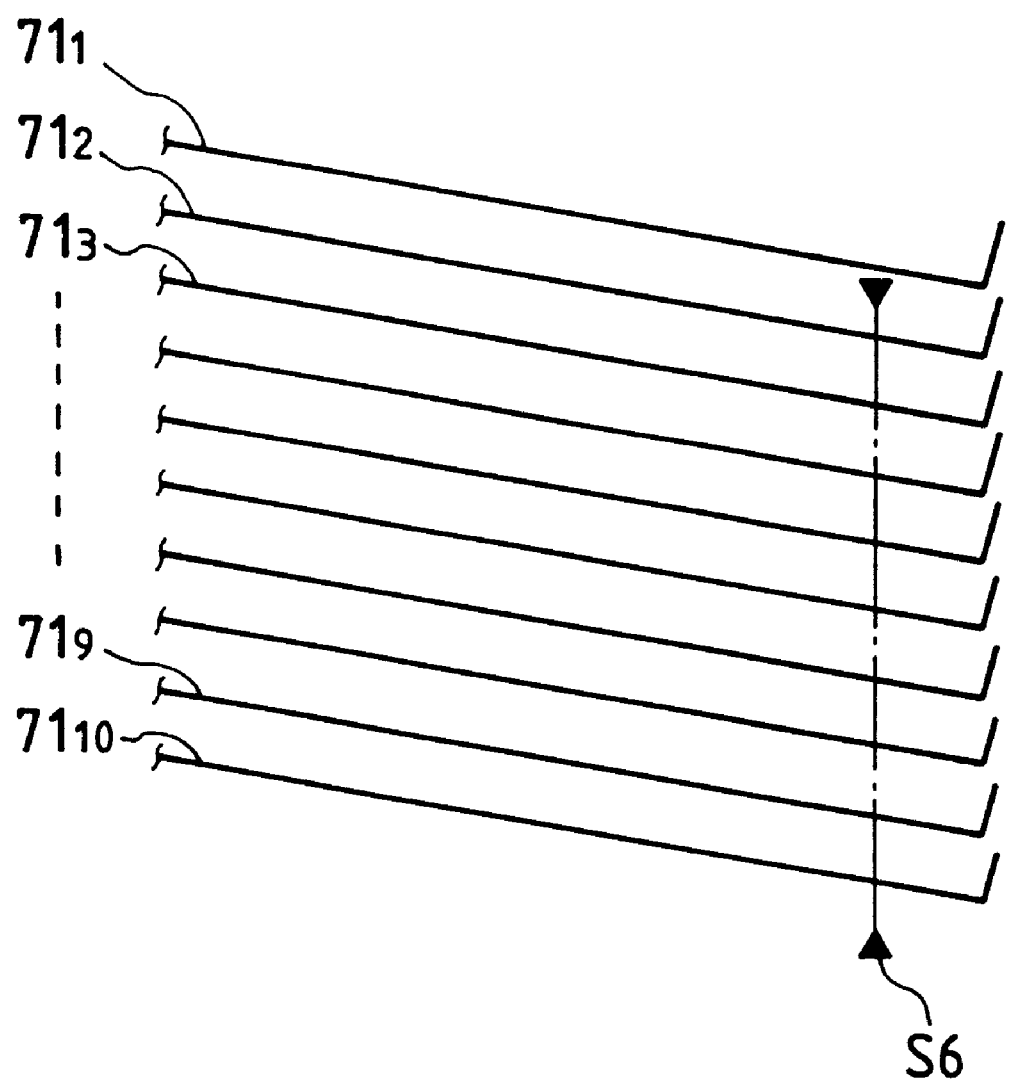
FIG. 10 is a view showing a through sensor portion near a bin tray.

Referring to FIGS. 2 and 10, a sheet sensor (through sensor) S6 is commonly used for all of the second to tenth bins $71_2$ to $71_{10}$ except for the first bin $17_1$ as the uppermost bin. When a sheet is present on at least one bin except for the first bin $71_1$, the optical path of the sensor is shielded by the sheet, thereby detecting the presence of the sheet.

In any reception or copy mode (to be described later), the first bin $71_1$ as the uppermost bin of the bin tray unit 501 is moved downward to a position corresponding to the discharge roller pair 67 in a standby state. The bin tray unit 501 waits at this home position.

When the lead cams 77 are intermittently driven in the forward direction by one revolution, the bin tray unit 501 is moved upward by a distance corresponding to one bin.

Figure 11:
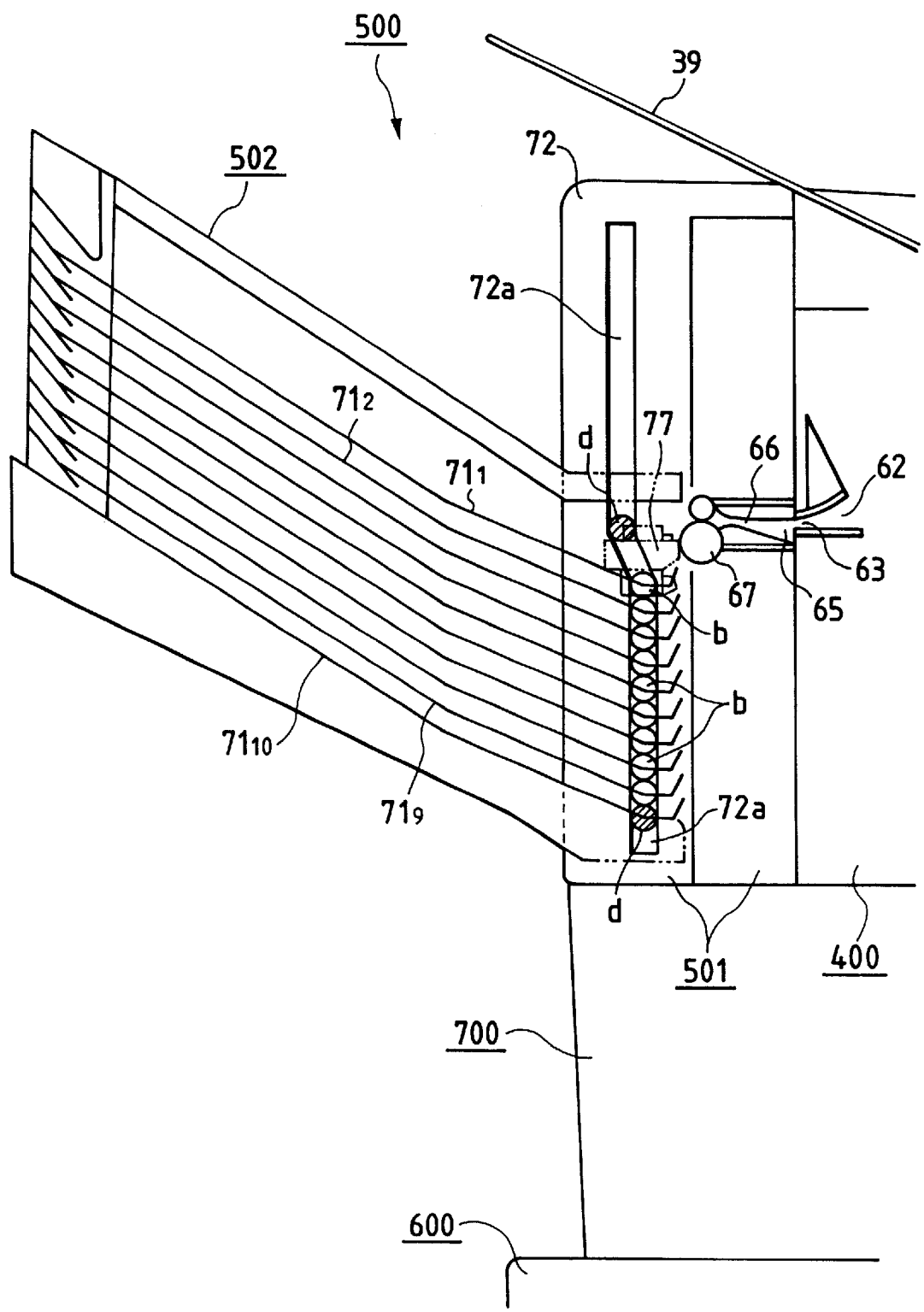
FIG. 11 is a view showing a state in which the bin tray unit is moved downward to a home position and an uppermost bin tray is waited at a position corresponding to a discharge roller pair.

FIG. 12 is a view showing a state in which the bin tray unit 501 is moved upward from the home position shown in FIGS. 2 and 11 by a distance corresponding to one bin, and the second upper bin $71_2$ is located at a position corresponding to the discharge roller pair 67.

FIG. 13 is a view showing a state in which the sixth bin $71_6$ is located at a position corresponding to the discharge roller pair 67.

FIG. 14 is a view showing a state in which the tenth bin $71_{10}$ as the lowermost bin is located at a position corresponding to the discharge roller pair 67.

The upper limit position of the bin tray unit 501 is the position shown in FIG. 14 when the tenth bin $71_{10}$ as the lowermost bin is located at a position corresponding to the discharge roller pair 67. From this state, when the lead cams 77 are intermittently driven in the reverse direction by one revolution, the bin tray unit 501 is moved downward by a distance corresponding to one bin. Finally, the bin tray unit 501 is returned to the home position in FIGS. 2 and 11.

E. Control System between Units

Figure 15:
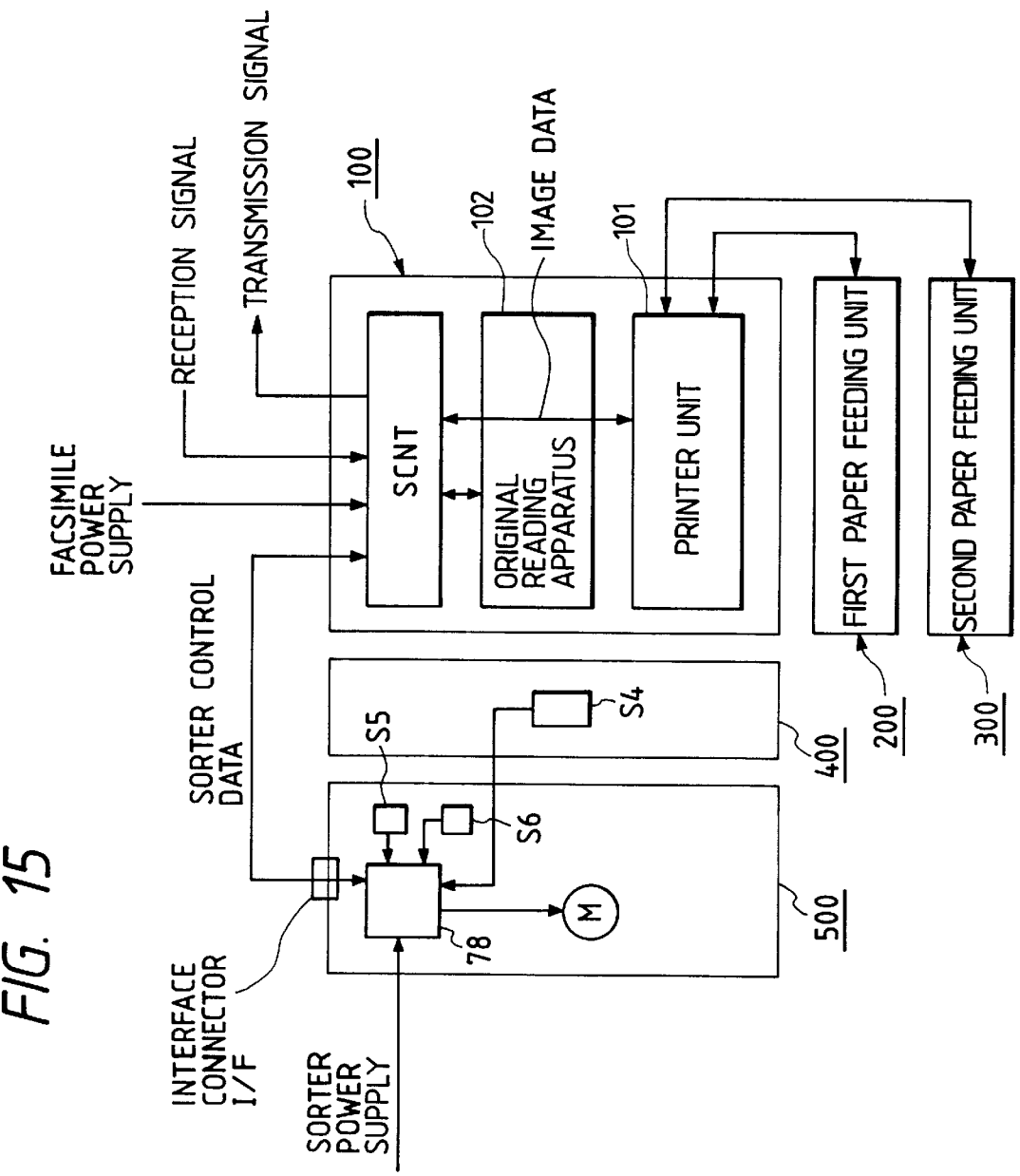
FIG. 15 is a block diagram showing a control system between apparatuses.

FIG. 15 is a block diagram showing a control system between the facsimile main body 100, the first and second paper feeding units 200 and 300, and the sorter 500.

In this embodiment, a controller SCNT of the facsimile main body 100 relays data between the printer unit 101 of the facsimile main body 100 and the sorter 500.

That is, a facsimile controller controls the printer unit 101 and the sorter 500 in an interlocked manner.

Since the sorter 500 is controlled in accordance with the address or transmission source of sheets (recording paper) output from the facsimile main body 100, it is difficult to control the sorter through the printer unit. As in this embodiment, when the printer unit 101 and the sorter 500 are controlled by the controller SCNT of the facsimile main body 100, the above control is facilitated.

The printer unit 101 of the facsimile main body 100 and the sorter 500 can be mechanically connected to each other. By connecting them through the adapter 400, any type of machine can be used.

The controller SCNT of the facsimile main body 100 and a controller 78 of the sorter 500 are electrically connected to each other through an interface connecter I/F. A short pin is provided on the sorter side of the interface connecter I/F to detect the connection.

The controller SCNT of the facsimile main body 100 receives a reception signal and outputs a transmission signal. The controller SCNT controls the original reading apparatus 102 and the printer unit 101. The printer unit 101 controls the first and second paper feeding units 200 and 300.

The controller 78 of the sorter 500 controls the reversible motor M of the bin tray vertical drive mechanism. The controller 78 also sends signals from the sheet sensor S4 in the adapter 400, the sheet sensor S5 of the sorter 500, and the through sensor S6 to the controller SCNT of the facsimile main body 100.

F. Normal Reception (Sorting Reception for Each Communication)

Figure 16:
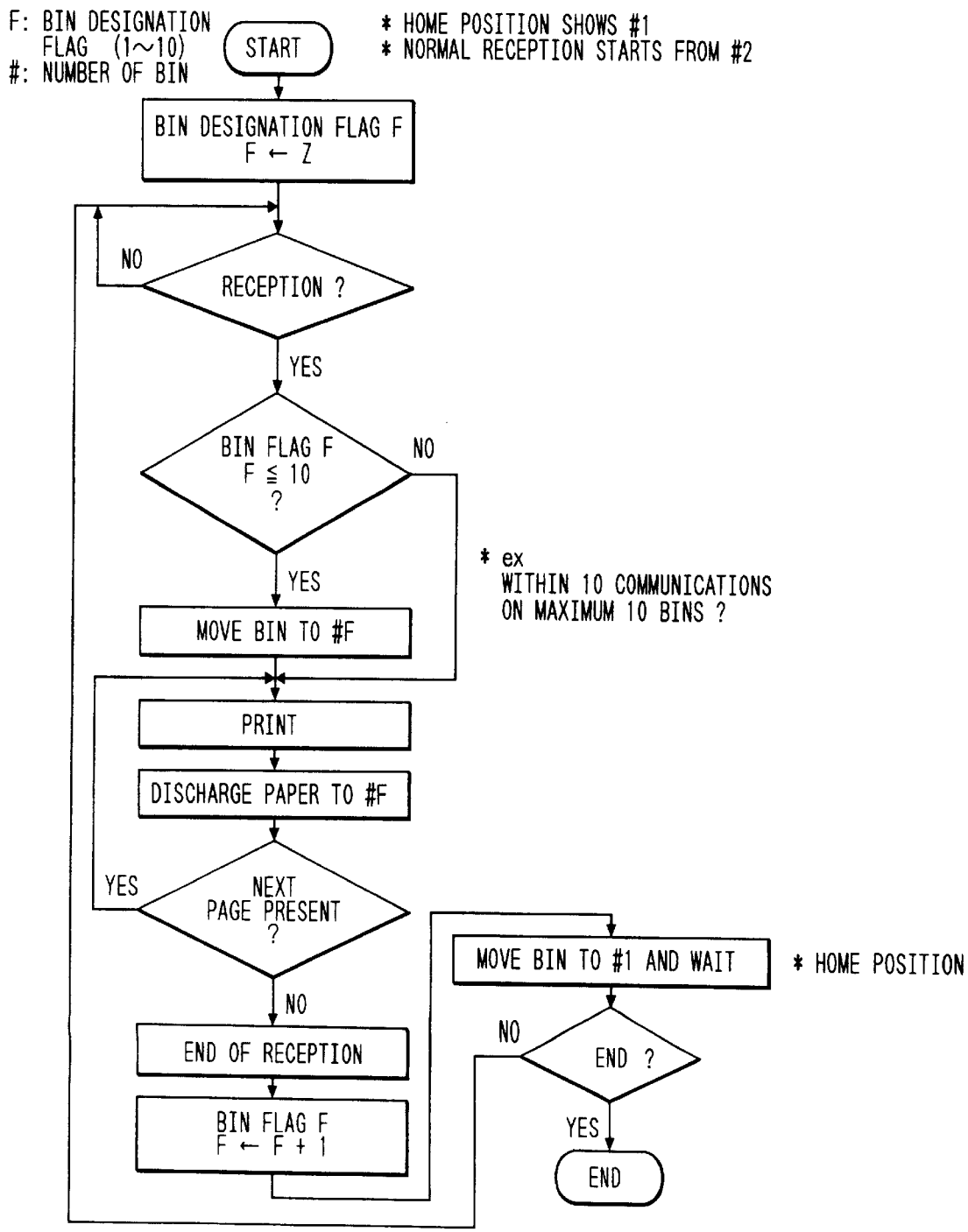
FIG. 16 is a flow chart showing an operation in a normal reception mode.

FIG. 16 is a flow chart showing an operation in a normal reception mode.

As described above, transmission information from a partner facsimile apparatus is received while being stored in the memory of the control system of the facsimile main body 100. By storing the transmission information in the memory, the number of reception pages is acknowledged. The reception information stored in the memory is read out, and the printer unit 102 of the facsimile main body 100 performs a printing operation to output sheets as reception recording paper.

As described above, in the sorter 500 of this embodiment, the first bin $71_1$ (uppermost bin, upper bin, or upper tray) of the bin tray unit 502 has a capacity to store 100 sheets. Each of the lower second to tenth bins $71_2$ to $71_{10}$ (intermediate bins) has a capacity to store 20 sheets. In a 20-sheet group mode, sheets of LGL, LTR or A4 can be stored. In a 30-sheet sort mode, sheets of LTR or A4, or 25 sheets of LGL can be stored.

Upon power-ON (reset), the bin tray unit 502 waits at the lower limit position, i.e., at the home position in FIGS. 2 and 11 when the bin $71_1$ as the uppermost bin is located at a position corresponding to the discharge roller pair 67.

In the normal reception mode, the bin tray unit 502 is moved upward by one bin for each communication, thereby sequentially sorting and storing sheets of one communication output from the facsimile main body 100 to each bin. In this embodiment, the first bin $71_1$ as the uppermost bin is not used to sort sheets for each communication, and the lower second to tenth bins $71_2$ to $71_{10}$ are used.

A bin movement start timing is synchronized with a timing for outputting a print start signal. In the normal reception mode, the bin movement start timing is set such that no bin is moved during one communication.

After the reception operation is finished, the bin tray unit 502 is returned to the home position in FIGS. 2 and 11 and waits in this state wherein the first bin $71_1$ as the uppermost bin is located at a position corresponding to the discharge roller pair 67.

In this manner, sheets for each communication are sequentially sorted and stored on the second to tenth bins $71_2$ to $71_{10}$.

When sheets are stored on all of the second to tenth bins $71_2$ to $71_{10}$, sheets for subsequent communications are discharged and stored on the first bin $71_1$. A mode in which all sheets are forcibly discharged on only the first bin $71_1$ as the uppermost bin can also be selected.

As described above, the bin $71_1$ as the uppermost bin is located at the start position in a wait state, and the sorting operation is performed by discharging sheets to the bins $71_2$ to $71_{10}$ as the second bin et seq. When the sheets are discharged to all the bins $71_2$ to $71_{10}$, sheets are discharged to the bin $71_1$ as the uppermost bin. That is, the bin $71_1$ as the uppermost bin is kept to oppose the sheet guide port 67. When sheets are to be sorted, the second bin $71_2$ under the bin $71_1$ as the uppermost bin is caused to oppose the sheet guide port 67, and the bins are then sequentially moved upward. After the sorting operation of the sheets is finished, the bins are moved downward to a position where the bin $71_1$ as the uppermost bin opposes the sheet guide port 67, and then set in the wait state. With these control means, the bin as the uppermost bin which is frequently used and has a large sheet storage capacity is set in the wait state at the home position, and sheets are finally discharged to the uppermost bin, so that the sorter control is facilitated.

G. Bin Designation Reception (Mail Box and Mail Post)

Figure 17B:
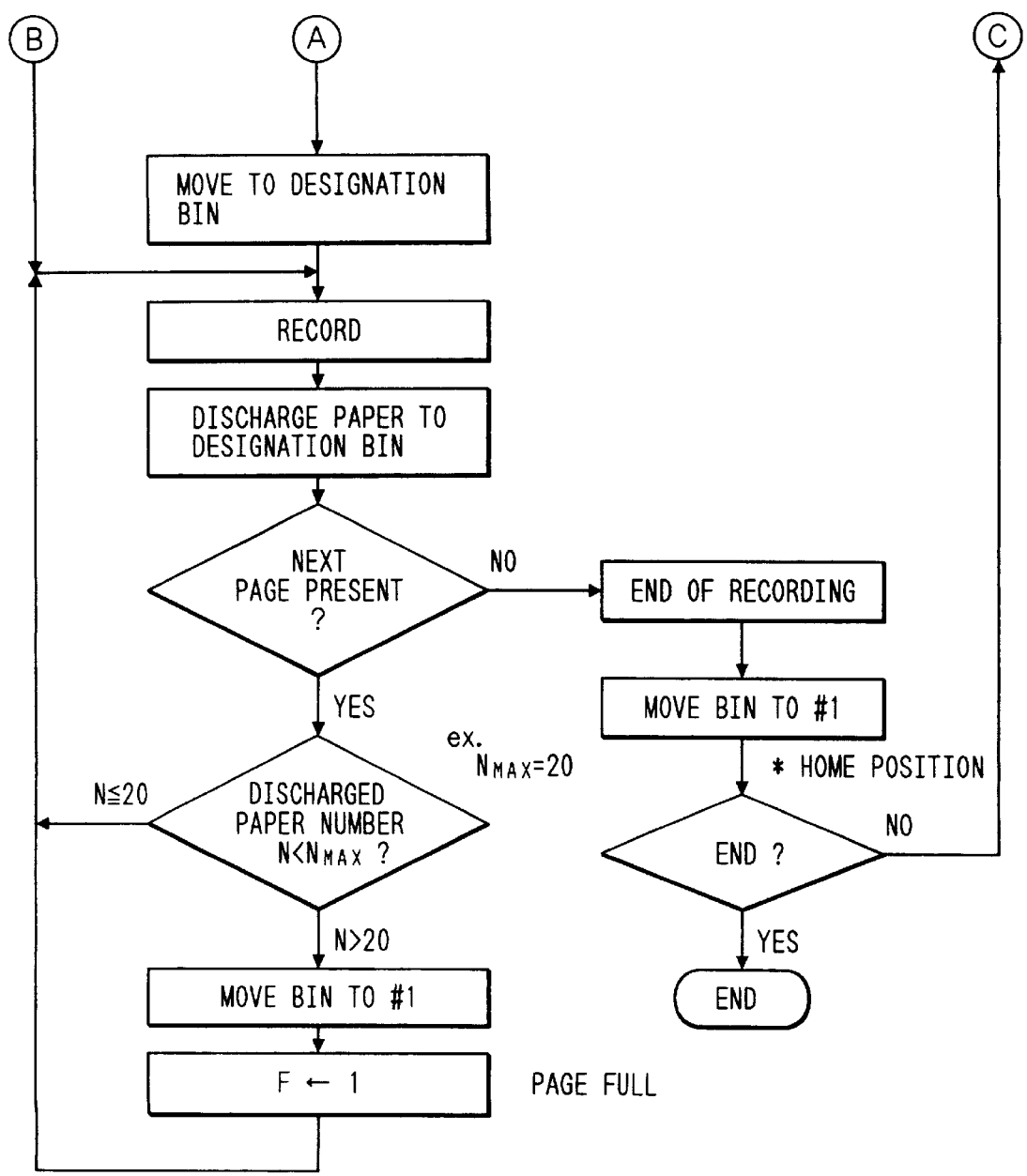
FIG. 17, comprised of FIGS. 17A and 17B, is a flow chart showing an operation in a bin designation reception mode.

FIGS. 17A and 17B are flow charts showing an operation in a bin designation reception mode.

In this reception mode, a sheet having information in a receiver-designated communication is discharged on a designated bin of the second to tenth bins $71_2$ to $71_{10}$ except for the first bin $71_1$. More specifically, the bin tray unit 502 is moved upward such that the designated bin tray is located at a position corresponding to the discharge roller pair 67 as the sheet guide port, and sheets are discharged and stored on the designated bin.

If the number of sheets is 20 or less, the sheets are discharged to the designated bin tray. If the number of sheets exceeds 20, the sheets are discharged to the first bin tray $71_1$ as the uppermost bin.

That is, since the sheet stackable number of each of the bins $71_2$ to $71_{10}$ to which sheets are normally discharged is as small as 20 in this embodiment, sheets on which images of a large number of pages are recorded cannot be discharged to one bin.

In this case, all of the pages of the reception images are stored in the memory, and the number of pages is counted. If the total page number is smaller than a predetermined number, sheets on which images are recorded are discharged to the designated bin. If the total page number is equal to or larger than the predetermined number, the sheets are discharged to the first bin $71_1$ (upper bin) as the uppermost bin having a larger stackable number.

In the bin designation reception mode, it is supposed that a user can only confirm the designated bin. For this reason, the user may overlook a sheet discharged to the other bin ($71_1$).

This problem can be solved by recording another first page (a sheet different from that discharged to the bin $71_1$ as the uppermost bin) when the total page number exceeds the predetermined number, and discharging this first page to the designated bin.

If the reception page number is larger than the predetermined number, a report which records that the reception image is discharged to another bin may be output to the designated bin.

Figure 18:
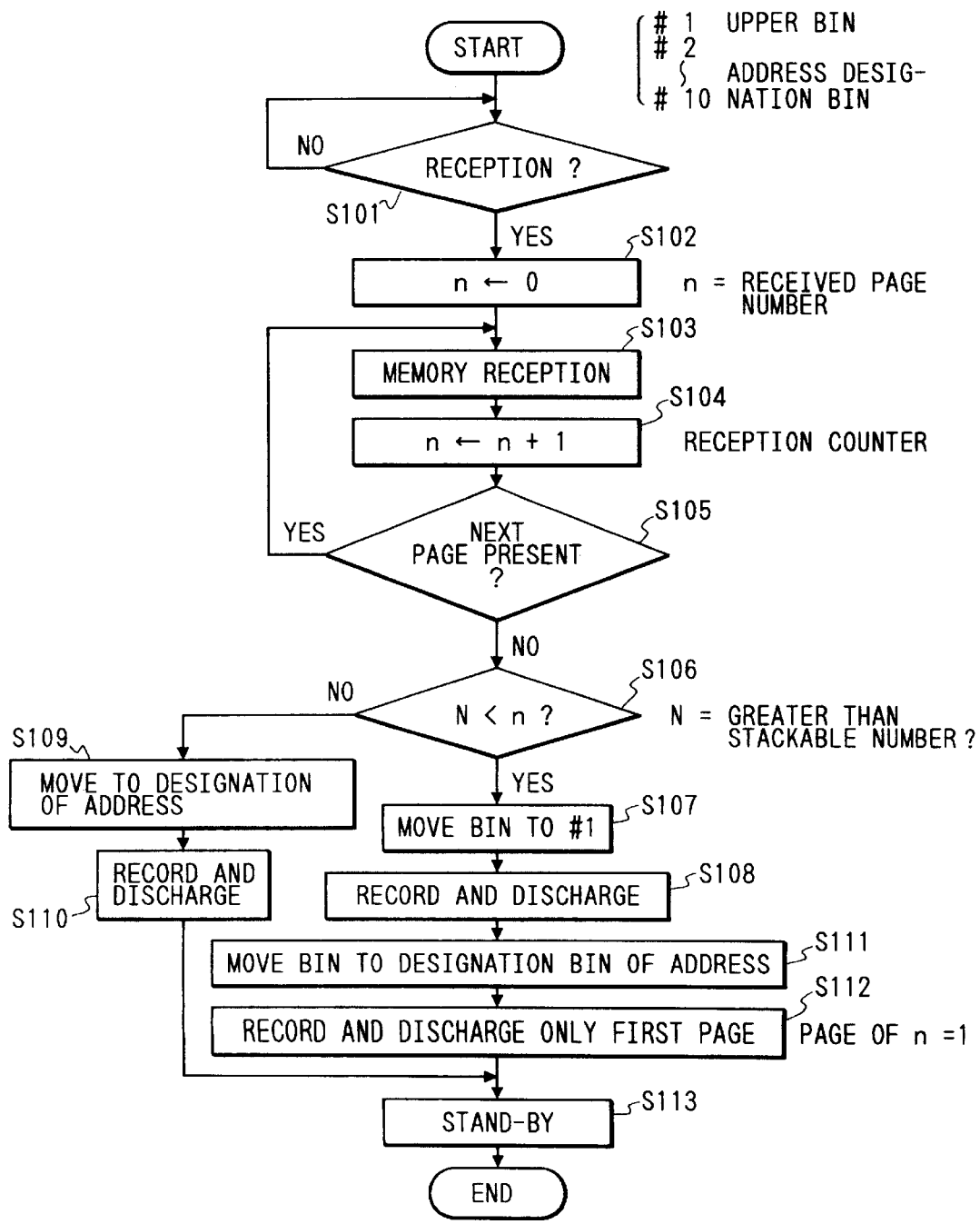
FIG. 18 is a flow chart showing an operation when the number of sheets to be stacked exceeds a stackable number in the bin designation reception mode.

FIG. 18 is a flow chart showing an operation in the above case, i.e., when the page number exceeds the stackable number in the bin designation reception mode.

When the bin designation reception mode is set (step S101), a received page number counter n is reset (step S102), and a memory reception is performed (step S103). When a next page is present, the page counter is incremented (steps S104 and S105).

Upon completion of one communication, it is checked if the received page number exceeds the maximum stackable number N of the bin tray (step S106). If YES in step S106, the bin tray unit 502 is moved such that the first bin $71_1$ (#1) as the uppermost bin is located at a position corresponding to the discharge roller pair 67 (step S107), and a recording/discharge operation is performed with respect to the bin $71_1$ (step S108).

Subsequently, to record only the first page again, the bin is moved to the designated bin of the address (step S111), and the recording/discharge operation of only the first page is performed with respect to the designated bin (step S112).

If NO in step S106, the bin is moved to the designated bin of the address (step S109), and a recording/discharge operation is performed with respect to the designated bin (step S110).

Finally, a stand-by state is restored (step S113).

H. Plural Copies Designation Reception (Sorting Reception)

Figures 19, 19A:
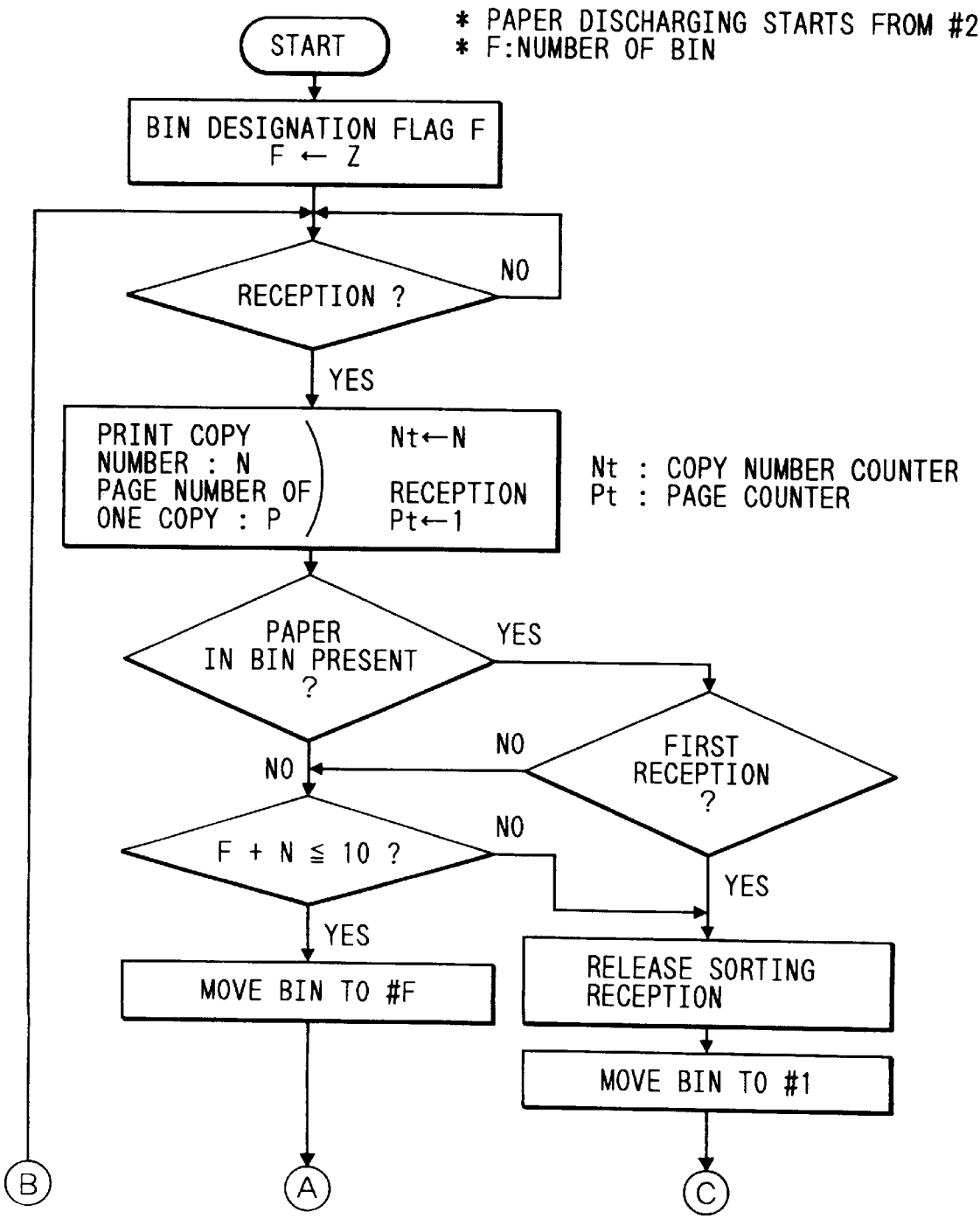
FIG. 19, comprised of FIGS. 19A and 19B, is a flow chart showing an operation in a plural copies designation reception mode.
Figure 19B:
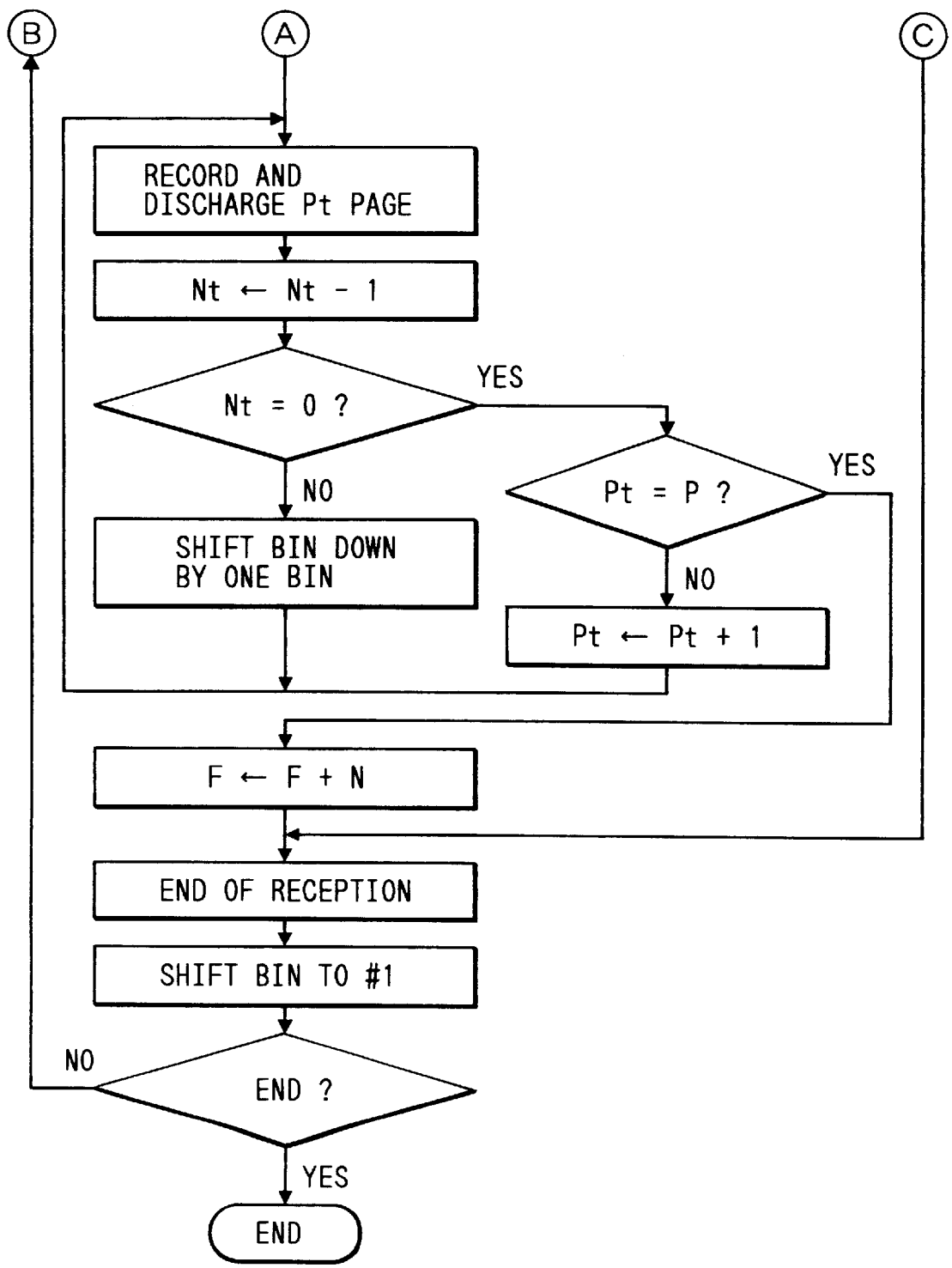

FIGS. 19A and 19B are flow charts showing an operation in a plural copies designation reception mode. In this mode, only a designated received copy number is sorted and discharged. The copy number can be designated by both a receiver and a sender. After the discharge operation is performed up to the tenth bin $71_{10}$, all sheets are discharged to the first bin $71_1$. When sheets are stacked on all of the bins, the plural copies designation mode is canceled.

The first to tenth bins $71_1$ to $71_{10}$ are conveniently sequentially represented by #1 to #10.

(1) When a copy number N is designated

First communication:

Sheets are discharged to #2, #3, . . . , #N−1.

Second communication:

If N−1+N=2N−1≦10, then #N, #N+1, . . . , #2N−1.

If N−1+N=2N−1>10, then all sheets are discharged to #1.

Example) If N=4

First communication: #2, #3, #4, #5

Second communication: #6, #7, #8, #9

Third communication et seq.: #1

(2) When sheets have already been stacked on the bins, there are two methods in which a) the plural copies designation is canceled b) sheets are discharged to the next bin.

Although the simpler method a) is not troublesome, the method b) in which a bin designation flag is stored can be described by the same means as those for other operations.

(3) Bin Movement Timing

1. Receive a sort mode designation command. Set a sheet-to-sheet designation to a value in a sorting mode.

The interval is delayed by 0.6 second for movement between adjacent bins.

The interval is delayed by 5.4 seconds for movement to #10 to #1.

2. Receive the print copy number and the page number of one copy.

3. Receive a print start signal.

4. Move to the designated bin tray.

5. After movement, detect the leading end of a sheet by the sheet sensor S5.

6. Detect the trailing end of the sheet by the sheet sensor S4.

7. Accelerate the rotation of the discharge roller pair 67.

8. Detect the trailing end of the sheet by the sheet sensor S5.

9. Decelerate the rotation of the discharge roller pair 67.
10. Move the bin tray.
11. Repeat 5 to 10 for the print copy number.
12. After printing, return the bin tray to #1.

I. Memory Reception (1) Sorting for Each Communication Mode

Figure 20:
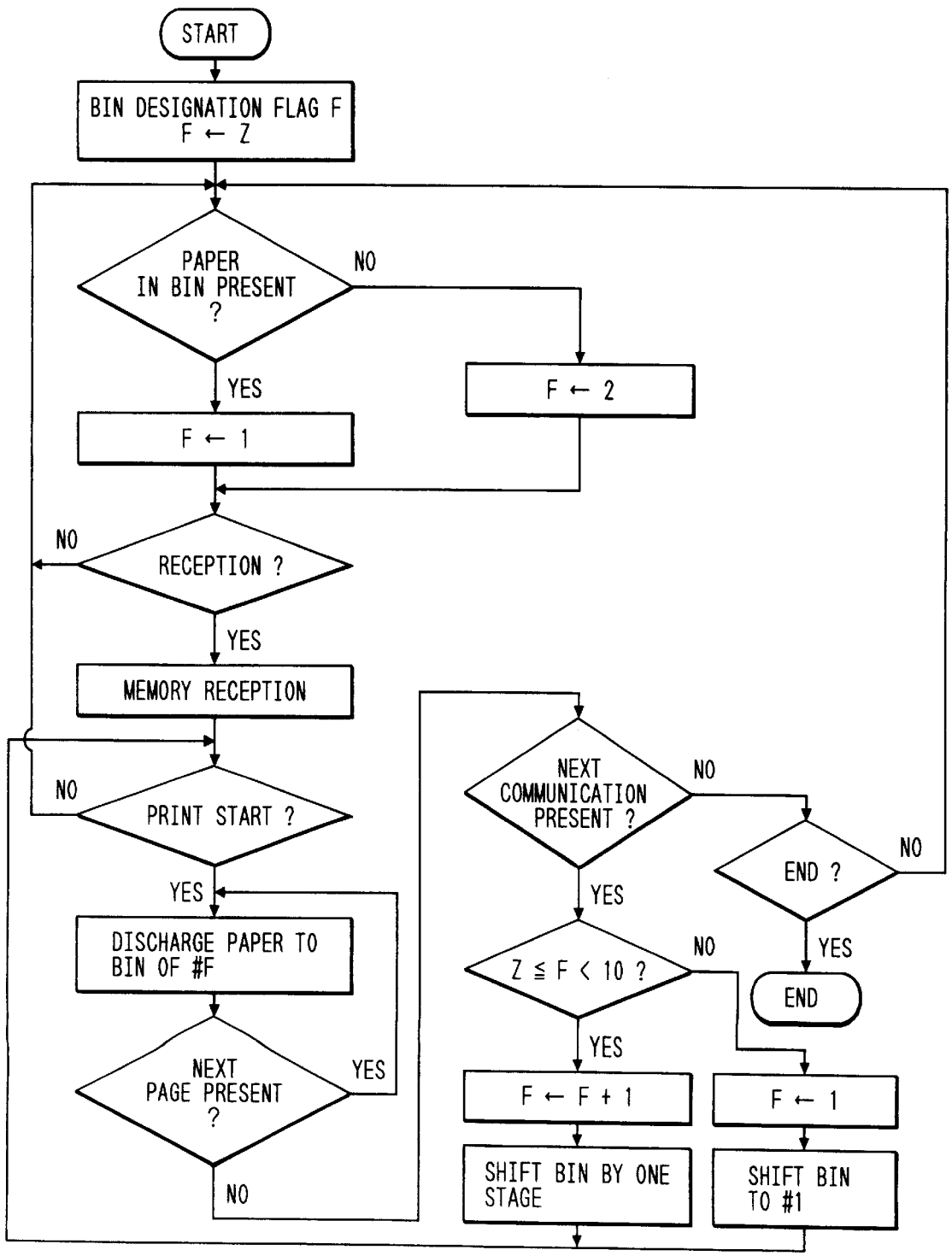
FIG. 20 is a flow chart showing an operation in memory reception (sorting and discharging for each communication mode)

FIG. 20 is a flow chart showing an operation in this mode. Sheets are sequentially discharged to #2, #3, . . . , #10, and #1 for each communication.

(2) Confidential Reception

All confidential reception sheets are output to the first bin $71_1$ (upper tray or #1) as the uppermost bin. A mode for sorting sheets for each communication can also be selected.

Recording of a confidential received image on a sheet is started when a receiver inputs a password. For this reason, the sheet is discharged to a bin which is easily accessed by the receiver rather than a designated bin.

A sheet having a normal reception image is discharged to the designated bin. Recording of the confidential received image is started when the password is input, and the sheet having the confidential received image is discharged to the first bin $71_1$ (#1) as the uppermost bin regardless of the bin designation.

Figure 21:
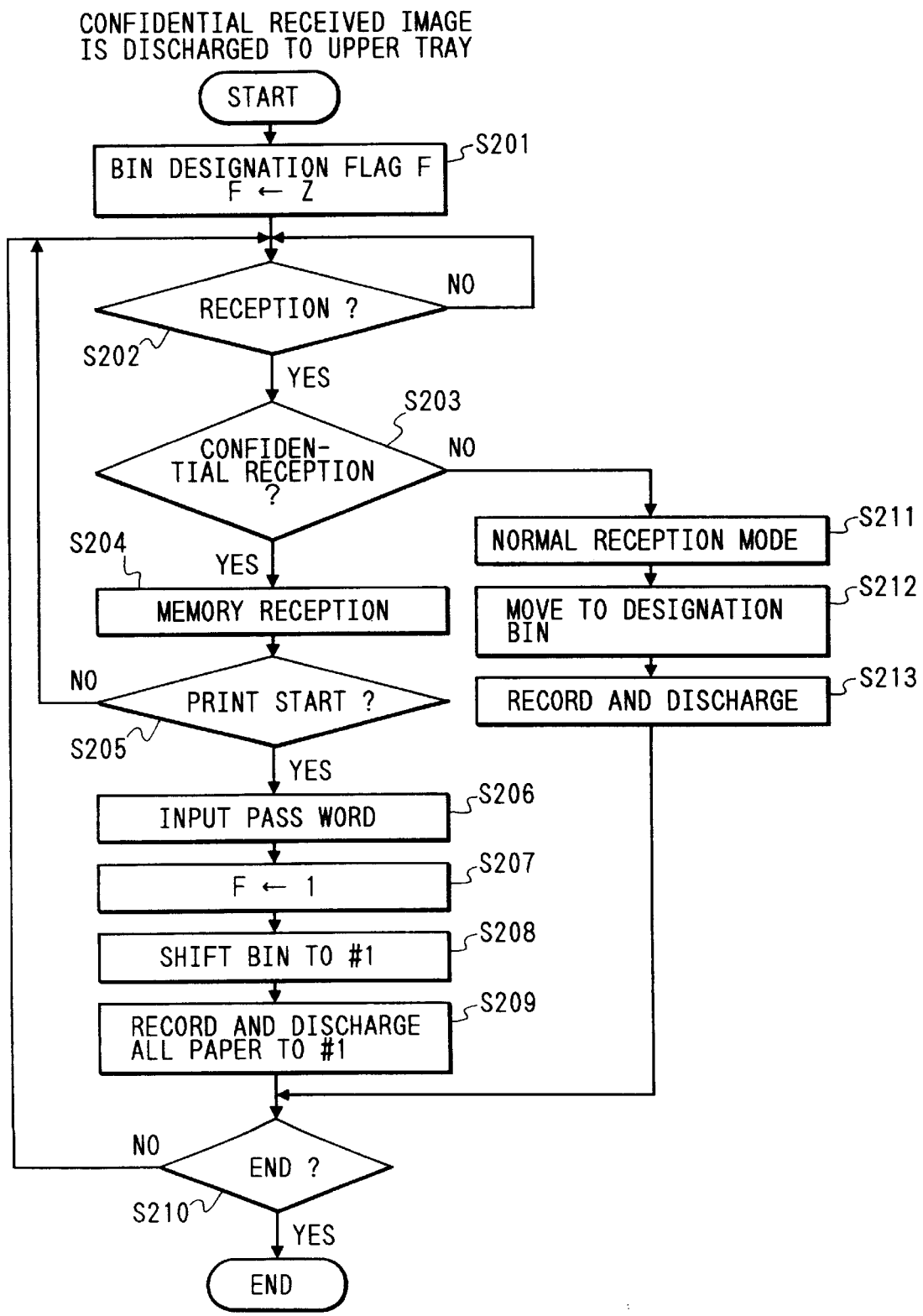
FIG. 21 is a flow chart showing an operation in memory reception (confidential reception mode)

FIG. 21 is a flow chart showing an operation in this confidential reception mode.

More specifically, in the normal reception, since the bins are used starting from the second bin $71_2$ (#2), 2 is set to a bin designation flag F (step S201). If an image is received (step S202), the mode is analyzed (step S203). If it is the confidential reception mode, the image is received in the image memory (step S204).

If it is not the confidential reception mode in step S203, it is the normal reception mode (step S211). The bin is moved to the designated bin (step S212), and the recording/discharge operation is performed with respect to the designated bin (step S213).

When recording is to be started after the confidential reception operation is performed (step S205), the password is input (step S206) to start the recording operation. One is set to the bin designation flag (step S207), the bin is shifted to the bin $71_1$ as the uppermost bin (step S208), and the recording/discharge operation is performed with respect to the bin as the uppermost bin (step S109), thereby ending the process (step S210).

J. Sorting Reception for Each Communication (Multi-Polling)

Figure 22A:
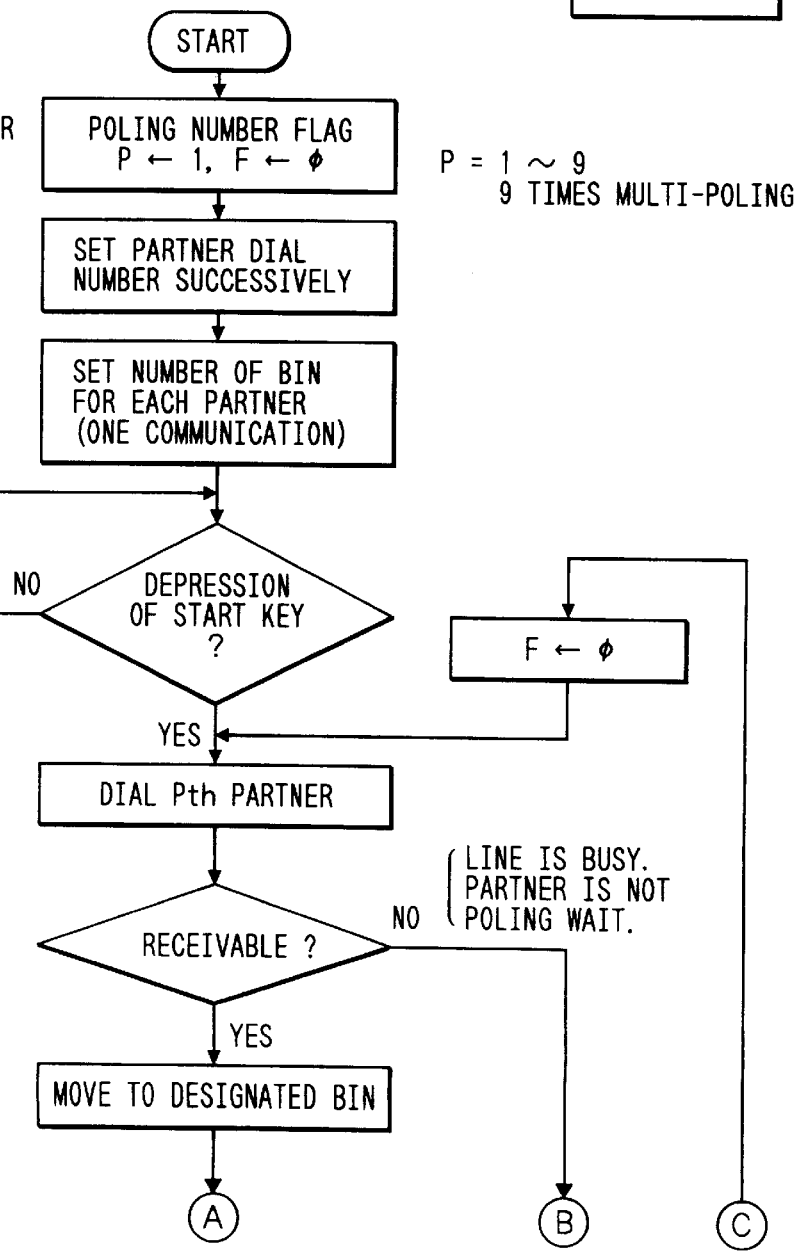
FIG. 22, comprised of FIGS. 22A and 22B, is a flow chart showing an operation in a multi-polling reception mode.
Figure 22B:
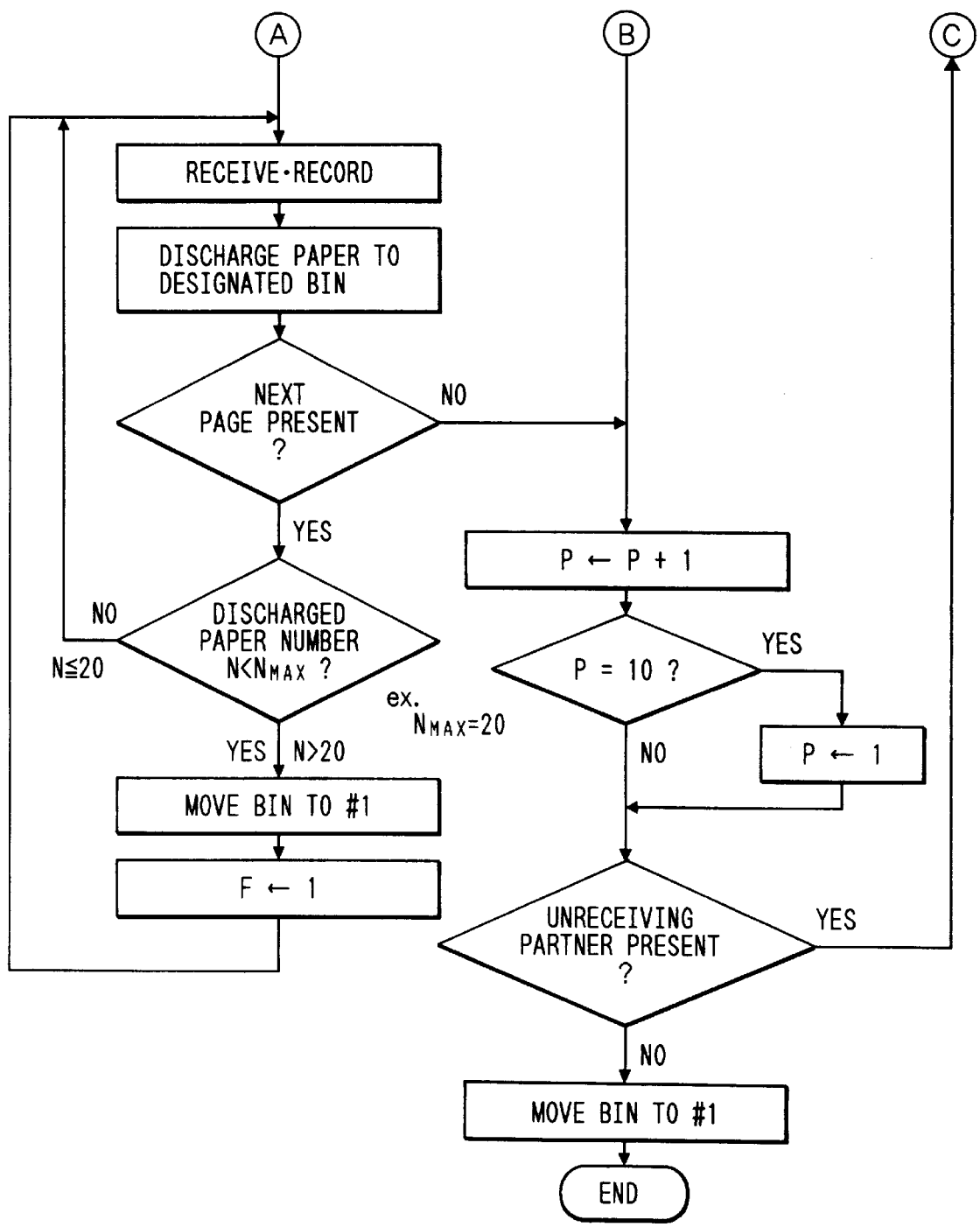

FIGS. 22A and 22B are flow charts showing an operation in a multi-polling reception mode. In the multi-polling reception mode, an image is output to a designated bin for each communication.

The facsimile main body 100 has a polling function. The facsimile main body 100 has, in the control panel 51 and the controller, a means for designating a bin corresponding to a polling partner, a means for selecting a bin corresponding to a numerical signal, and a means for discharging a polling reception image to the selected bin.

That is, when a plurality of partner numbers which are set in advance are sequentially called, and a reception image is obtained in the polling mode, the reception image is output to a bin corresponding to the partner.

This operation copes with a case wherein the partner is busy, and a polling reception operation cannot be performed in the set order.

K. Copy (1) Normal Copy

When the original O is set on the original support portion 31 of the facsimile main body 100, and the copy key (FIGS. 5A and 5B) of the operation panel 51 is depressed, the original O is fed into the original reading apparatus 102 one by one. The image information is photoelectrically read by the photoelectric image reading element array 36. The original O after reading is discharged to the tray 39.

The printer unit 102 performs a printing operation to output a copy. The copy is discharged to the first bin $71_1$ (#1) as the uppermost bin of the sorter 500.

(2) Sort Copy

1. A multi-copy mode is designated in a state wherein the sorter 500 is connected to the facsimile main body 100. When the copy number N is 10 or less, a sort copy mode is automatically selected.

When the copy number N exceeds 10, only ten copies are printed. Thereafter, a message of "take paper" is displayed (liquid crystal display 52), and a wait state is restored (N←N−10).

If more copies are to be printed, the start button is depressed again (memory multi-copy).

When the original is only one sheet, the printed copies are discharged to #1 regardless of the designated copy number.

2. In the sort copy mode, a plurality of copies are printed. Therefore, it is supposed that no sheet is present on any bin.

3. When the sort copy mode is designated, and sheets are present on the bin, the message of "take paper" is displayed, and the wait state is restored.

4. When the sheets are removed, and the sort copy mode is designated again, the message of "take paper" is cleared, and the sort copy mode is set.

5. In the state of 3, when the original is removed in the wait mode, the message of "take paper" is cleared.

Figure 23:
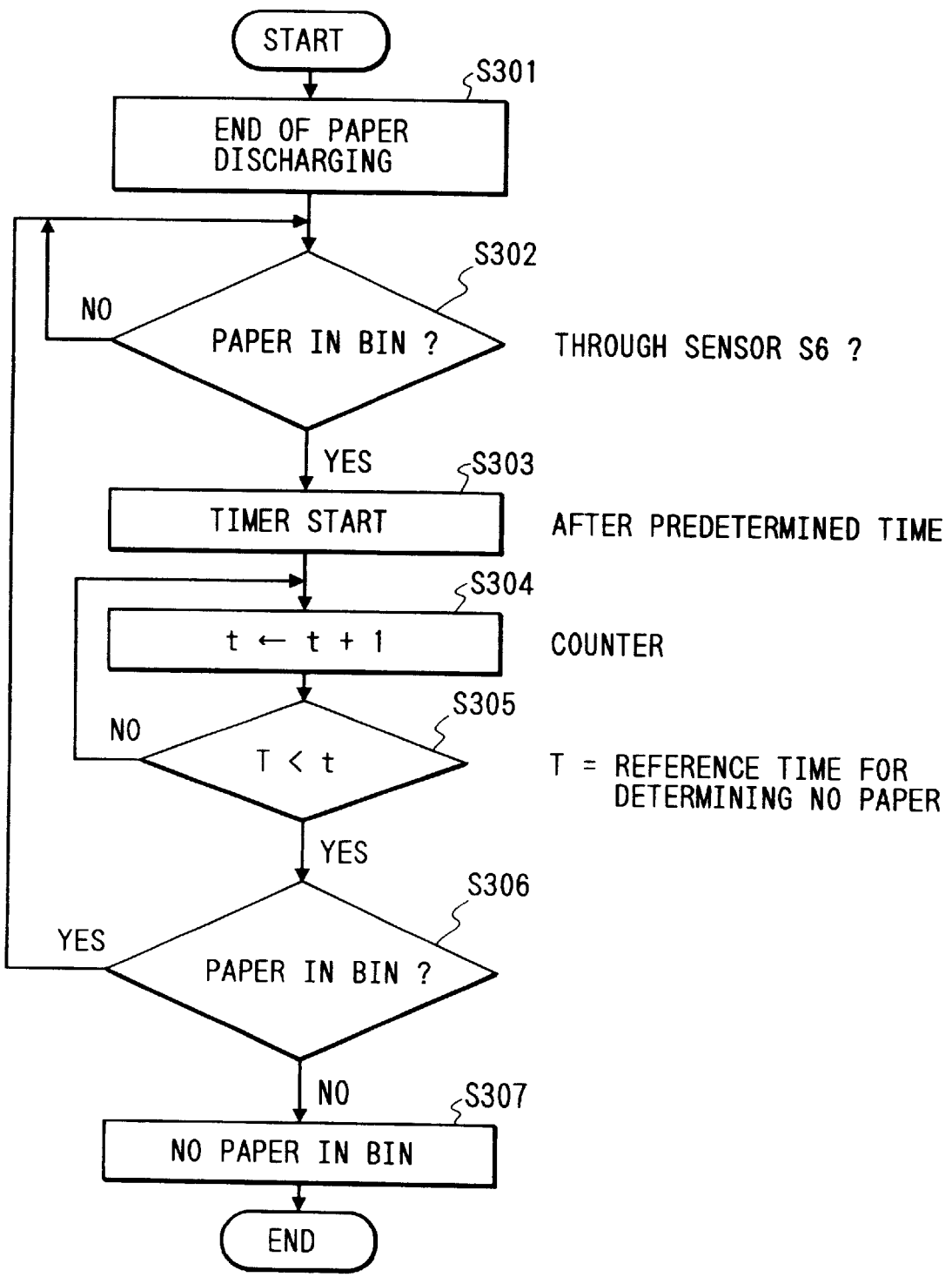
FIG. 23 is a flow chart of a method of detecting the presence or absence of a sheet in a bin.

FIG. 23 is a flow chart of a method of detecting the presence or absence of a sheet in a bin.

When a discharge operation with respect to a bin is finished (step S301), the state of the paper-in-bin sensor (through sensor) S6 is checked (step S302). If paper is present, a timer is started (step S303). A timer counter for counting a predetermined time is incremented (step S304). When a predetermined reference time has elapsed (step S305), the sensor S6 is checked again (step S306). Only when it is determined in step S306 that no paper is present, it is determined that no paper is present in the bin (step S307).

L. Emergency Operation (1) Reception During the Sort Copy Operation

An image is received using the remaining image memory except for that used for sorting.

(2) Sheet Replenishment During the Sort Recording Operation

After sheets (recording paper) are set, the remaining image is output with the start button.

(3) Operation After a Jam Process During the Sort Recording Operation

After the jam process, on the operation panel 51,
when "output rest" is selected, the output operation is restarted from the jammed sheet;
when "select rest" is selected, the output operation is restarted from a designated bin or page; and
when "output again" is selected, the output operation is performed from the first page.

M. Emergency Print-Out

In the facsimile apparatus, even when the sorter 500 fails, it is necessary to constantly receive an image. For this reason, if a recorded image is not output, the memory overflows.

In the apparatus of this embodiment, upon malfunction (failure) of the sorter 500, a user can mechanically separate the sorter 500 from the facsimile main body 100, and data can be output by the operation of the user.

More specifically, a means for mechanically separating the sorter 500 from the facsimile main body 100 by the user upon malfunction of the sorter 500 is provided. From the states of the sorter power supply, the connection sensor on the sorter side, the I/F connector, and the connection sensor on the main body side, it is determined whether an emergency print-out state is set, thereby inhibiting or permitting the recording operation.

Depending on the connection state of the sorter, the operation must be inhibited or performed. Therefore, a means for detecting the connection state is needed.

| Sorter Power Supply | Connection Sensor on Sorter Side | I/F Connector | Connection Sensor on Main Body Side | Connection State | Output |
|---|---|---|---|---|---|
| ON | ON | ON | ON | Normal connection | Normal output |
| OFF | ON | ON | ON | Sorter abnormality | Output inhibition |
| ON/OFF | OFF | ON | ON | Sorter abnormality | Output inhibition |
| ON/OFF | ON/OFF | OFF | ON | Poor Connection | Output inhibition |
| ON/OFF | ON/OFF | OFF | OFF | Poor coupling | Output inhibition |
| ON | OFF | ON | OFF | Decoupling | Compulsory output |

(1) State in which the operation must be performed
 1. Non-option (standard) state
 2. Normally set state
 Mechanical connection, I/F cable connection, and power-ON
 3. Emergency print-out
 Upon failure of the sorter, data can be output by the operation of the user.
(2) State in which the operation must be inhibited
 1. During jam process
 2. Although the sorter is mechanically connected to the facsimile main body, the I/F cable is disconnected, or the power supply of the sorter is in an OFF state.

Figure 24:
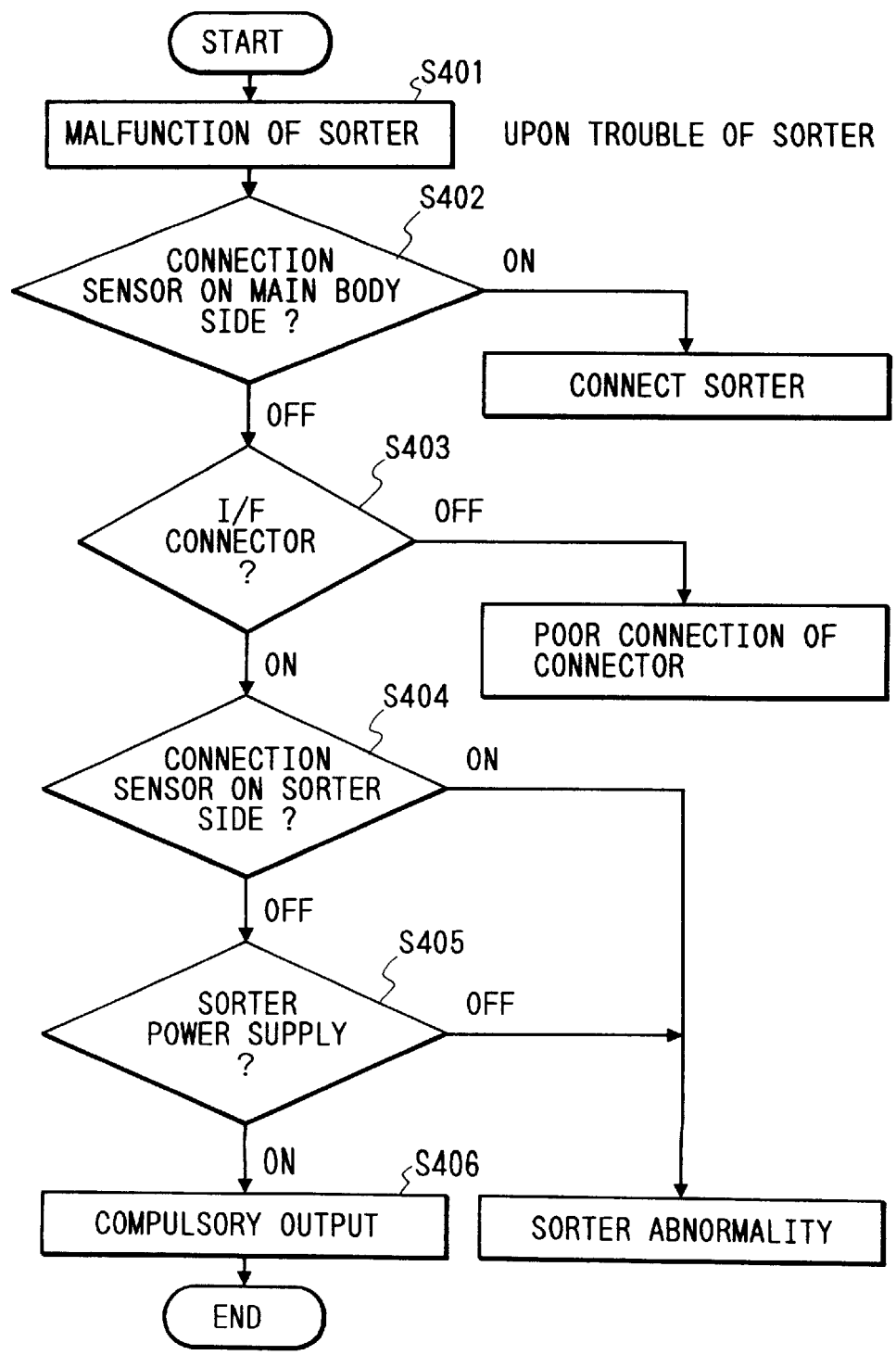
FIG. 24 is a flow chart showing an emergency output upon malfunction of a sorter.

FIG. 24 is a flow chart showing an operation of the emergency output upon malfunction of the sorter.

Upon malfunction of the sorter, the compulsory output operation of data is performed to prevent the image memory from overflowing. Upon malfunction of the sorter (step S401), the connection sensor on the main body is checked (step S402). If the sensor is ON, it is determined that the sorter is connected to the main body, and the sorter must be detached from the main body.

If the sensor is OFF in step S403, it is checked whether the I/F connector is connected (step S403). If the I/F connector is OFF, it is determined that the connector has poor connection.

If the I/F connector is ON in step S403, the connection sensor on the sorter side is checked (step S404). If the sensor is OFF, disconnection of the sorter is confirmed, as in step S402, so the state of the power supply of the sorter is checked (step S405). If the power supply is ON, it is determined that the compulsory output operation must be performed.

If ON in step S404, or OFF in step S405, a sorter abnormality is confirmed.

N. 30-Sheet Sort Mode and 20-Sheet Group Mode

As described above, in this embodiment, the sheet storage number of each of the bins $71_2$ to $71_{10}$ as the second bin et seq. of the sorter 500 is set to 20. However, when a predetermined number or more of sheets are to be discharged, the bins are temporarily moved. After the discharged sheets are aligned, the remaining sheets are discharged. With this operation, the predetermined number or more of sheets can be discharged and stored in a bin. The sheet stackable number in the bin can be increased to use the maximum capacity of the bin.

More specifically, a control means is provided to select a sort mode in which every time sheets are discharged to one bin, the bin vertical moving means is operated to move the bin upward or downward, or a group mode in which sheets are continuously discharged to one bin. With this arrangement, the sheet permissible number of one bin in the sort mode becomes larger than that in the group mode.

When the page number of a recorded image is larger than the sheet permissible number in the group mode, the bin is moved to the adjacent bin before the recording sheets are discharged up to the sheet permissible number in the group mode. Thereafter, the bin is returned to the home position, and the remaining sheets are discharged.

With the vertical movement of the bin, the sheets in the bin are swung and aligned, thereby increasing the discharged sheet stackable number of the bin.

O. Countermeasure for Curling of Sheet

A sheet having an image with a high black rate printed thereon tends to curl. When a sheet which is curled beyond an allowable amount (e.g., 15 mm) is discharged to a narrow bin, subsequent sheets may be jammed, or the next sheet may be discharged under the curled sheet. Therefore, control is performed such that, of images stored in the memory, a reception image having a page with a predetermined black rate or more is discharged to the first bin $71_1$ (#1) as the uppermost bin.

Figure 25:
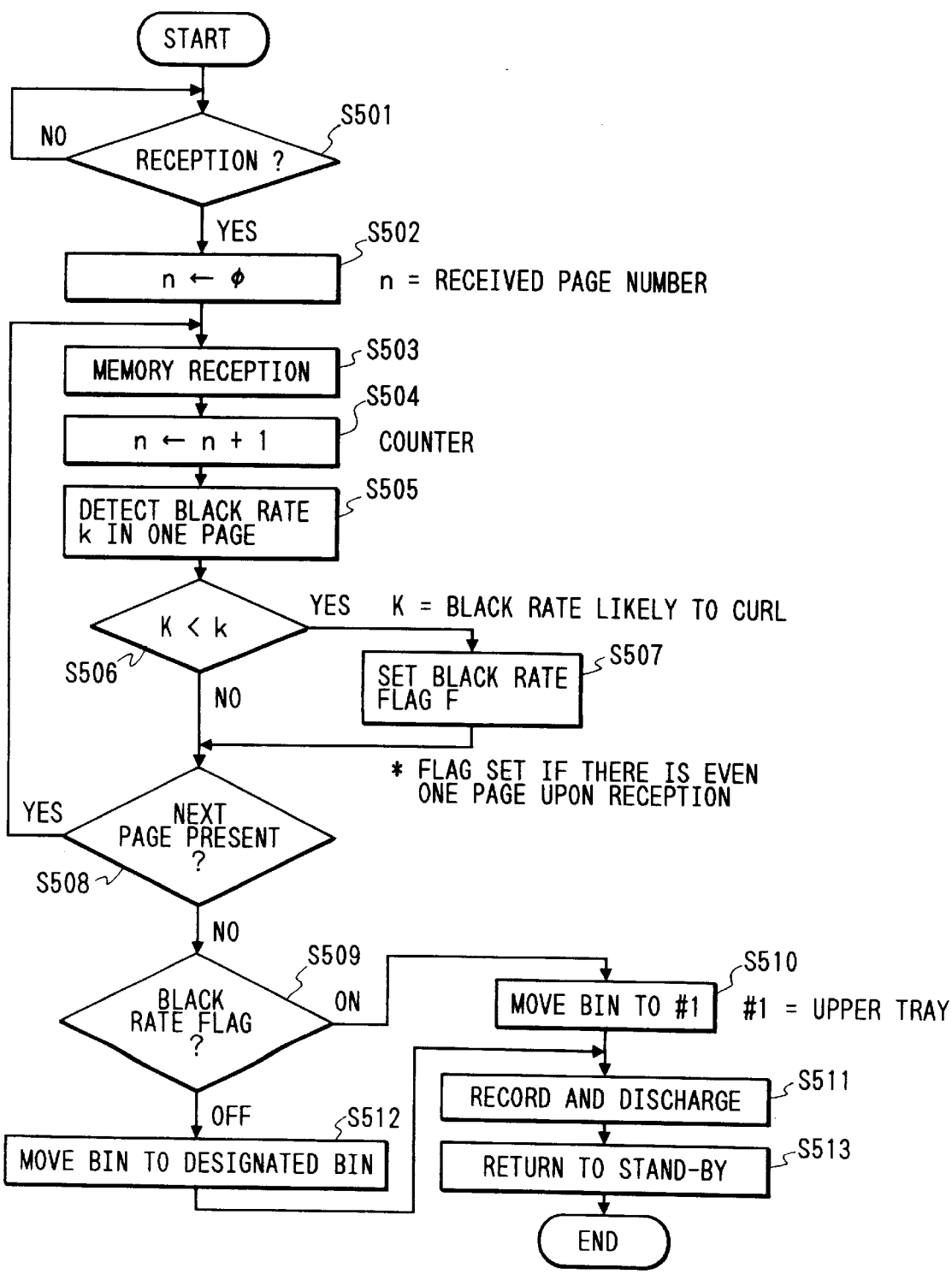
FIG. 25 is a flow chart of a countermeasure upon curling a sheet having a high black rate.

FIG. 25 is a flow chart showing an operation of a countermeasure for curling of a sheet having a high black rate.

Upon reception (step S501), the received page number counter n is reset (step S502), and the memory reception is performed (step S503).

While incrementing the counter n (step S504), a black rate k in one page is detected (step S505).

Every time the memory reception of one page is completed, it is checked whether a flag k exceeds a reference value K of the black rate likely to curl (step S506). If YES in step S506, a black rate flag F is set (step S507).

If a next page is present (step S508), the same process is repeated. When one communication is finished, the black rate flag is checked (step S509). If ON in step S509, since an image which causes a sheet to be likely to curl is contained, the bin is moved to #1 (step S510). The recording/discharge operation is performed with respect to the first bin (upper tray) $71_1$ as the uppermost bin (step S511).

If OFF in step S509, since no image which causes a sheet to be likely to curl is contained, the bin is moved to a designated bin of an address (step S512). The recording/discharge operation is similarly performed, and a stand-by state is restored (step S513).

P. Countermeasure for Careless Removal of Sheet Discharged to Bin

As described above, the sheet sensor S6 (through sensor) in FIGS. 2 and 10 is a sensor (sheet-in-bin detector) for detecting that a sheet is present in any one of the plurality of bins $71_2$ to $71_{10}$ (#2 to #10). In a wait state, when all sheets stacked on the bins $71_2$ to $71_{10}$ are removed, the optical path of the sensor S6 is opened to clear the bin designation flag. When the sensor S6 is turned on before the discharge operation, the bin designation flag is set to #10. All sheets are then discharged to #1.

A user may remove sheets from a bin to confirm whether they are destined for him. If the sheets are not destined for the user, the sheets may be returned to the bin. In this case, the sensor S6 is temporarily turned on, and then turned off again.

This case and another case wherein sheets are placed on a bin must be processed in different ways. More specifically, in the former case, the operation must be continued. In the latter case, since the bin storing the sheets is unknown, all subsequent sheets must be discharged to #1.

To cope with this situation, when the sensor S6 detects that a sheet in a bin is removed and that no sheet is present for a predetermined period of time, it is determined that no sheet is present in the bin. With this operation, the error control of the apparatus caused due to the ON/OFF of the sensor S6 when the sheet is carelessly removed from a bin can be prevented.

Q. Discharge Bin of Communication Management Report

Although other sheets are removed from the bins, the communication management report (a communication end report, an error message, a memory transmission end report, and the like) discharged to a bin tends to be left in the bin. For this reason, when such a communication management report is discharged to the bins $71_2$ to $71_{10}$ whose paper sheet is detected by the sensor S6, the sensor S6 always detects the presence of a sheet due to the presence of the communication management report left in the bin although all other sheets are removed. Therefore, sorter control may not be efficiently performed.

For this reason, sheets except for those of reception and copy images are discharged to a bin whose sheets are not detected by the sensor S6, i.e., the first bin $71_1$ (upper tray or #1) in this embodiment. With this operation, the above disadvantage can be solved.

Figure 26:
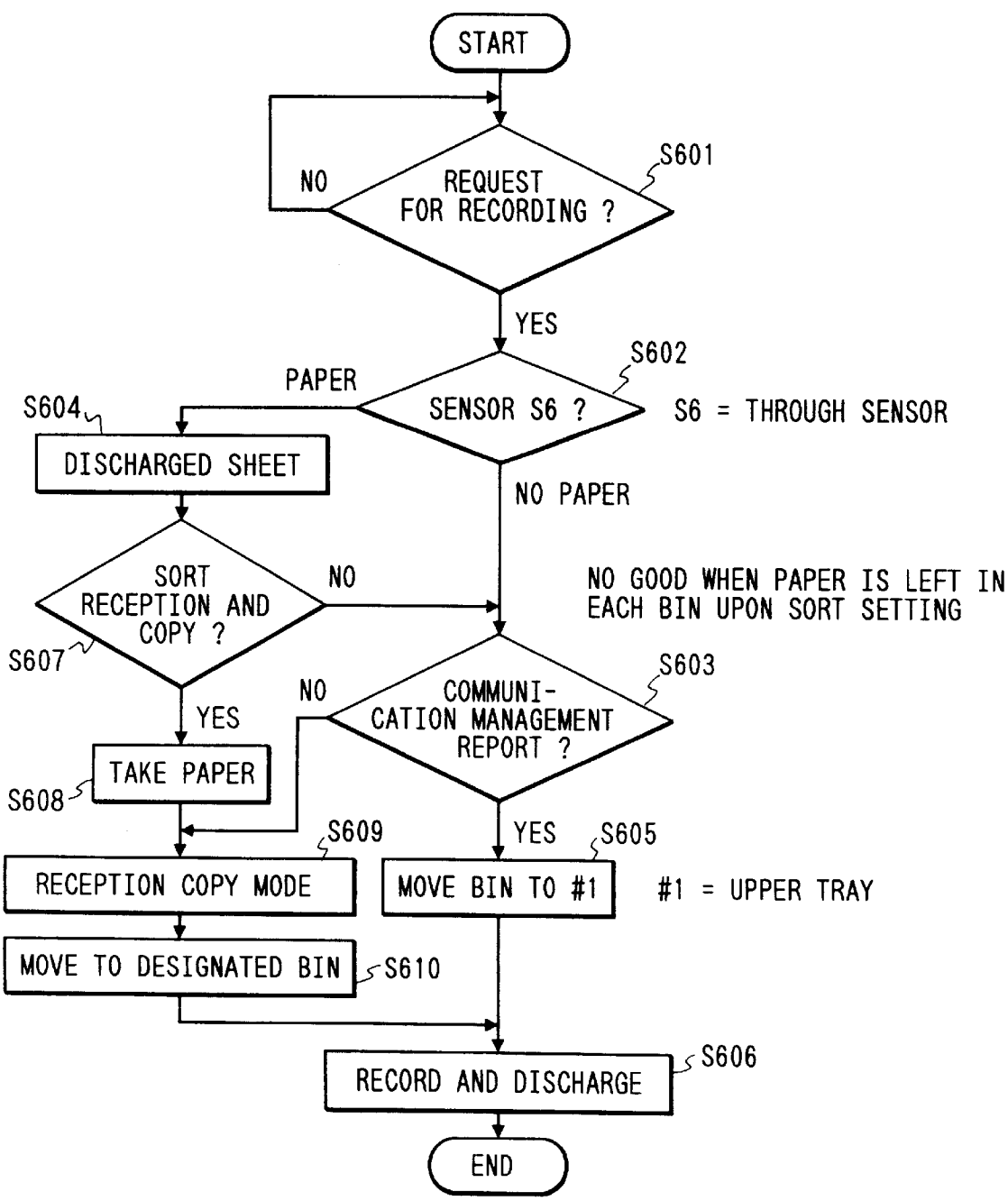
FIG. 26 is a flow chart for discharging a report or the like for communication management to an upper tray.

FIG. 26 is a flow chart of an operation in this mode.

When a request for recording is output (step S601), the paper-in-bin detector (through sensor) S6 is checked (step S602). If no paper is detected, it is determined that no paper is present in any bin.

It is determined whether the request for recording is output for a communication management report or a normal reception/copy operation (step S603).

In step S603, if a report request is output (YES), the bin of the sorter is moved to the upper tray #1 (step S605) to perform the recording/discharging operation (step S606).

In step S602, if the presence of paper is detected, a recorded sheet is present in any bin. In this case, sort reception or sort copy cannot be performed. This is checked in step S607. If sorting is not needed, the same process as that subsequent to step S603 is performed.

If sorting is needed in step S607, a message of, e.g., "take paper" is displayed, and the sheet must be removed (step S608). Thereafter, the bin is moved to a designated address (step S610) because of the reception and copy mode (step S609) to perform the recording/discharge operation (step S606).

R. Discharge Speed

In the printer unit 101 of the facsimile main body 100 of this embodiment, as an image fixing means, the film heating type fixing unit 9 (FIG. 4) which is excellent in the quick start characteristics and the like is used, as described above. For example, a heat roller pair type fixing unit has a strong sheet nip force (grip force). For this reason, even if a difference in speed with respect to the discharge roller is large to some extent, an image is not so influenced. However, in the film heating type fixing unit 9, the sheet nip force is relatively weak. The influence of the discharge speed is large, so it is considered that the covey speed of the sorter must be matched with the process speed.

In this embodiment, even in the fixing unit having a weak small sheet nip force, the sheet convey force on the downstream side does not influence an image.

(1) In accordance with the process speed (about 24 mm/s in this embodiment) of the fixing unit 9, the convey speed is increased after paper is discharged from the main body.

(2) The sheet grip force of the discharge roller on the connecting adapter is increased, and one general convey speed is caused to correspond to a plurality of process speeds.

(3) A timing for discharging paper from the printer is accurately detected to increase the convey speed.

1. A time from the TOP is calculated from the paper size and the process speed.
2. A status signal representing the passage of a sheet through the discharge sensor is newly set.
3. A BPS (photointerruptor) is newly set.

In this embodiment, there are provided the discharge rotary bodies 11 for discharging sheets fixed by the fixing unit 9 to the discharge tray, and a control means for controlling the rotational speed of the rotary bodies 11. With this control means, when a sheet is gripped by the fixing means, the same speed as the rotational speed of the rotating bodies is set. When the sheet is released from the fixing means 9, the convey speed is increased.

There are also provided the convey rotary bodies 10 arranged between the fixing means 9 and the discharge rotary bodies 11 and rotating at the same speed as that of the fixing means 9, and a driving means for rotating the discharge rotary bodies at a speed higher than that of the convey rotary bodies and slidably supporting the discharge rotary bodies.

S. Stapler

A stapler for binding a set of a plurality of sheets discharged to a bin can be provided to the sorter 500.

(1) A sheet position at which the sheets are bound by the stapler is determined from a reception image, and the sheets are output.

(2) Reception images are reversely output from the last line, and the sheets are bound by the stapler.

Since a face-up recording system is used in this embodiment, the stapler is provided on the rear side of the apparatus.

As the arrangement of the apparatus, an image recording apparatus having a stapler comprises a memory for temporarily recording a reception image, a means for determining the upper and lower sides of the reception image, and a means for setting the directions of a sheet (recording paper) and an image output such that sheets are bound at the upper left corner of the reception image by the stapler.

In addition, another image recording apparatus having a stapler comprises a memory for temporarily recording a reception image, and a recording means for outputting the reception image from last pixel information.

As has been described above, the image communication apparatus has a function of counting the page number while storing reception images of all of the pages in the memory, and discharging the sheets of the reception image to a designated bin tray of a plurality of bin trays. In the bin tray designation reception (mail box) mode in which a sheet having information in a receiver-designated communication is discharged to a designated bin tray, when the total page number of the reception images exceeds a predetermined stackable number of the designated bin tray, or the reception image communication is confidential, the apparatus is systematically operated.

When the total page number is smaller than the predetermined number, sheets on which the images are recorded are discharged to the designated bin tray. When the total page number is equal to or larger than the predetermined number, the sheets are discharged in a bin tray having a larger stackable number. With this control, overflow of sheets in the designated bin tray can be prevented.

In addition, the sheets of normal reception images are discharged to the designated bin tray. A confidential received image is recorded when a password is input, and the sheet of the confidential received image is discharged to the uppermost bin tray regardless of bin tray designation. For this reason, the sheet can be easily removed.

Furthermore, the image communication apparatus comprises a plurality of bin trays, and a sorter for sorting recording sheets output from the image communication apparatus. A through sensor for detecting the presence of a sheet in any bin tray of the predetermined bin trays, and a bin tray different from the predetermined bin trays, whose sheets are not detected by the through sensor, are provided. Sheets of a communication management report or the like, i.e., sheets except for those of reception or copy image are discharged to the bin tray whose sheets are not detected by the through sensor. With this operation, although the communication management report is not removed, the through sensor does not detect the presence of a sheet because this bin tray is not related to the through sensor. Therefore, sorter control can be efficiently performed.

What is claimed is:

1. An image recording apparatus comprising:
   input means for inputting image data of a page unit;
   recording means for recording an image onto a sheet in accordance with the image data inputted from said input means;
   a plurality of first trays for storing the sheets recorded by said recording means;
   a second tray for storing sheets in which a storage capacity is greater than that of said first trays;
   detecting means for detecting a number of pages in which one group of images is constituted; and
   control means for storing sheets recorded with the pages in which one group of images is constituted in a designated one of said first trays when the page number detected by said detecting means is not more than a predetermined number, and for storing all of the sheets recorded with the pages in which one group of images is constituted in said second tray irrespective of designation when the detected page number is more than the predetermined number.

2. An apparatus according to claim 1, wherein said detecting means counts pages of the image data inputted from said input means.

3. An apparatus according to claim 1, wherein said plurality of first trays are bins arranged in a perpendicular direction, and the second tray is the uppermost bin.

4. An apparatus according to claim 1, wherein said input means performs facsimile reception.

5. An apparatus according to claim 4, wherein said control means has the sheet stored in the first trays corresponding to a recipient when the detected page number is not more than the predetermined number, and has the sheet stored in the second tray irrespective of the designation of the recipient when the detected page number is more than the predetermined number.

6. An apparatus according to claim 1, further comprising memory means for storing the image data input by the input means,
   wherein said detecting means counts the page number when the image data is stored in said memory means.

7. An apparatus according to claim 1, wherein when the detected page number is more than the predetermined number, said control means stores the sheet in said second tray and records the image of a first page onto each of two sheets, one of which is stored in said first trays.

8. An apparatus according to claim 1, wherein said control means stores the sheet in said second tray when the detected page number is more than the predetermined number, and stores the sheet onto which a report is recorded in one of said first trays.

9. An image recording method in an image recording apparatus comprising:
   a plurality of first trays for storing sheets and a second tray for storing sheets in which a storage capacity is greater than that of said first trays, comprising the steps of:
   inputting image data of a page unit;
   recording an image onto a sheet in accordance with the image data;
   detecting a number of pages in which one group of images is constituted; and
   storing sheets recorded with the pages in which one group of images is constituted in a designated one of said first trays when the detected page number is not more than a predetermined number, and storing all of the sheets recorded with the pages in which one group of images is constituted in said second tray irrespective of designation when the detected page number is more than the predetermined number.

10. A method according to claim 9, further comprising the step of counting pages of the image data inputted in said detecting step.

11. A method according to claim 9, wherein said plurality of first trays and said second tray are bins arranged in a perpendicular direction, and said second tray is the uppermost bin.

12. A method according to claim 9, wherein facsimile reception is performed in said inputting step.

13. A method according to claim 9, further comprising the step of storing the sheet in the first trays corresponding to a recipient when the detected page number is not more than the predetermined number, and storing the sheet in the second tray irrespective of the designation of the recipient when the detected page number is more than the predetermined number.

14. A method according to claim 9, further comprising the step of storing the image data input in the input step, in memory means,
   wherein the page number is counted in said detecting means when the image data is stored in said memory area.

15. A method according to claim 9, wherein when the detected page number is more than the predetermined number, in said storing step, the sheet is stored in said second tray, and the image of a first page is recorded onto each of two sheets, one of which is stored in one of said first trays.

16. A method according to claim 9, wherein in said storing step, the sheet is stored in said second tray when the detected page number is more than the predetermined number, and the sheet onto which a report is recorded is stored in one of said first trays.

17. An image recording apparatus comprising:

input means for inputting image data of a page unit;

recording means for recording an image onto a sheet in accordance with the image data inputted from said input means;

a first tray for storing the sheet recorded by said recording means;

a second tray for storing the sheets recorded by said recording means;

detecting means for detecting a number of pages in which one group of images is constituted; and control means for storing the sheets recorded with the pages in which one group of images is constituted in said first tray when the page number detected by said detecting means is not more than a predetermined number and for storing all of the sheets recorded with the pages in which one group of images is constituted in said second tray when the detected page number is more than the predetermined number.

18. An image recording method in an image recording apparatus, comprising the steps of:

inputting image data of a page unit;

recording an image onto a sheet in accordance with the image data inputted in said inputting step, said apparatus comprising a first tray for storing sheets recorded in said recording step and a second tray for storing sheets in which a storage capacity is greater than that of said first tray;

detecting a number of pages in which one group of images is constituted; and storing the sheets recorded with the pages in which one group of images is constituted in the first tray when the page number detected in said detecting step is not more than a predetermined number, and storing all of the sheets recorded with the pages in which one group of images is constituted in the second tray when the detected page number is more than the predetermined number.

* * * * *

UNITED STATES PATENT AND TRADEMARK OFFICE
CERTIFICATE OF CORRECTION

PATENT NO. : 6,246,491 B1
DATED : June 12, 2001
INVENTOR(S) : Hiroaki Matsumoto et al.

It is certified that error appears in the above-identified patent and that said Letters Patent is hereby corrected as shown below:

Title page, Item [57] ABSTRACT,
Line 4, "number" should read -- number of --.

Column 1,
Line 32, "confidential" should read -- confidentially --.
Line 33, "his" should read -- their --.

Column 3,
Line 55, "an" should read -- a --.

Column 9,
Line 33, "inside" should read -- inside the --.

Column 11,
Line 3, "form" should read -- from --.
Line 23, "bin 17," should read -- bin 71, --.

Column 19,
Line 34, "F or" should read -- For --.

Signed and Sealed this

Eleventh Day of December, 2001

*Attest:*

NICHOLAS P. GODICI
*Attesting Officer*    *Acting Director of the United States Patent and Trademark Office*